(12) United States Patent
Matsushima et al.

(10) Patent No.: US 7,159,244 B2
(45) Date of Patent: Jan. 2, 2007

(54) AUDIO DATA PLAYBACK MANAGEMENT SYSTEM AND METHOD WITH EDITING APPARATUS AND RECORDING MEDIUM

(75) Inventors: Hideki Matsushima, Hirakata (JP); Katsumi Tokuda, Toluca Lake, CA (US); Shunji Harada, Osaka (JP); Teruto Hirota, Moriguchi (JP); Shinji Inoue, Neyagawa (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 803 days.

(21) Appl. No.: 09/959,827

(22) PCT Filed: Mar. 9, 2001

(86) PCT No.: PCT/US01/07429

§ 371 (c)(1),
(2), (4) Date: Jan. 3, 2002

(87) PCT Pub. No.: WO01/67668

PCT Pub. Date: Sep. 13, 2001

(65) Prior Publication Data

US 2002/0161571 A1    Oct. 31, 2002

Related U.S. Application Data

(63) Continuation-in-part of application No. 09/522,998, filed on Mar. 9, 2000, now abandoned, and a continuation-in-part of application No. 09/648,873, filed on Aug. 28, 2000, now abandoned.

(51) Int. Cl.
*G06F 21/24* (2006.01)
*G06F 7/04* (2006.01)
*G06Q 99/00* (2006.01)
*H04L 9/00* (2006.01)

(52) U.S. Cl. ............................. 726/30; 705/52; 705/57
(58) Field of Classification Search .................... None
See application file for complete search history.

(56) References Cited

U.S. PATENT DOCUMENTS 5,754,649 A * 5/1998 Ryan et al. .................. 380/203

(Continued)

FOREIGN PATENT DOCUMENTS

| EP | 1 081 616 | 3/2001 |
|---|---|---|
| EP | 1 130 496 | 9/2001 |
| EP | 1 143 439 | 10/2001 |

OTHER PUBLICATIONS

SDMI Portable Device Specification, Part 1, Version 1.0 (35 pages); Jul. 8, 1999.

(Continued)

*Primary Examiner*—Christopher Revak
(74) *Attorney, Agent, or Firm*—Wenderoth, Lind & Ponack, L.L.P.

(57) ABSTRACT

A management apparatus stores pairs of copyrighted contents and numbers of permitted check-outs. On being requested to perform check-out for a semiconductor memory card, the management apparatus records an audio object (AOB) corresponding to a content in the semiconductor memory card, assigns a content ID to the AOB, and decrements a corresponding number of permitted check-outs. An editing and playback apparatus plays back the AOB recorded in the semiconductor memory card. The editing and playback apparatus edits the AOB and assigns a content ID, which is the same as the content ID of the original AOB, to each new AOB obtained by the editing. A local storage holds history information including a media ID and the content ID assigned to the original AOB. On being requested to perform check-in for the semiconductor memory card, the management apparatus sets, in a non-playable state, the AOB assigned a content ID that is the same as the content ID in the history information and increments the number of permitted check-outs.

26 Claims, 29 Drawing Sheets

U.S. PATENT DOCUMENTS

| | | | |
|---|---|---|---|
| 5,768,387 A | 6/1998 | Akiyama et al. | 713/182 |
| 5,925,127 A * | 7/1999 | Ahmad | 726/31 |
| 6,052,780 A | 4/2000 | Glover | 713/193 |
| 2001/0026287 A1 | 10/2001 | Watanabe | |
| 2002/0165825 A1* | 11/2002 | Matsushima et al. | 705/51 |

OTHER PUBLICATIONS

Amendment 1 to SDMI Portable Device Specification, Part 1, Version 1.0 (2 pages); Sep. 23, 1999.

Guide to SDMI Portable Device Specification, Part 1, Version 1.0 (5 pages).

* cited by examiner

FIG. 13A
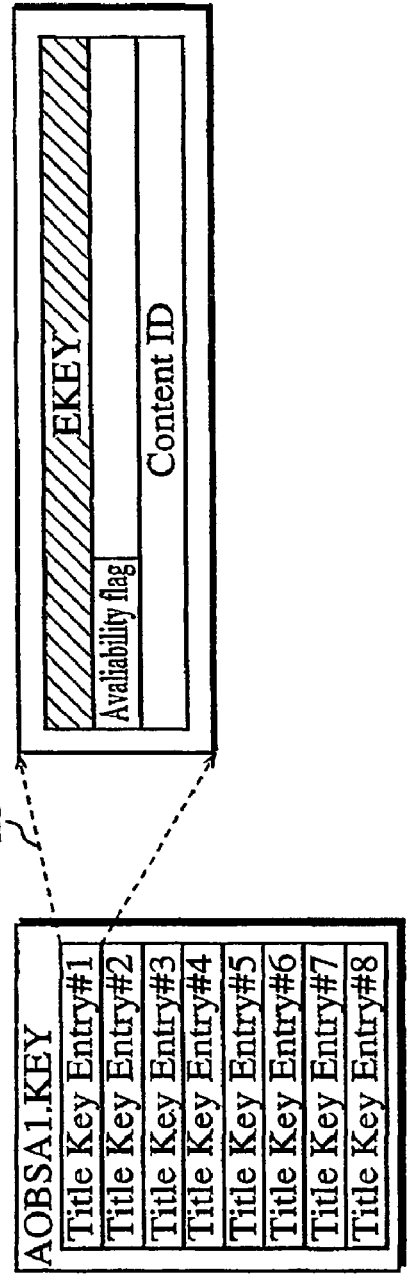
FIG. 13B
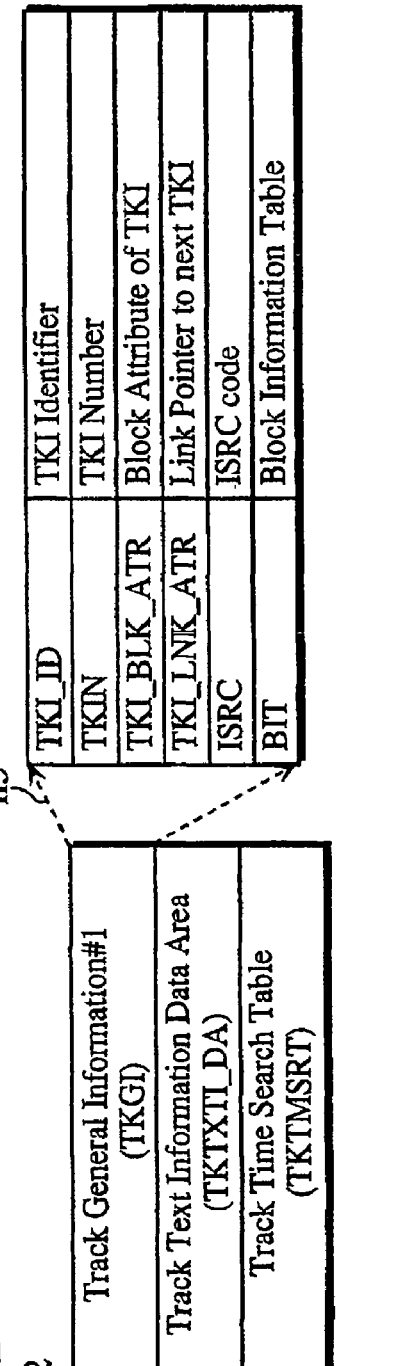
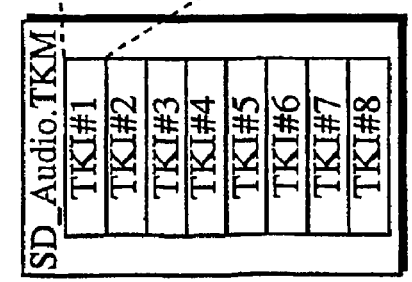

FIG. 15 TRACK.C IS DIVIDED INTO TRACK.C AND TRACK.F

FIG. 21A

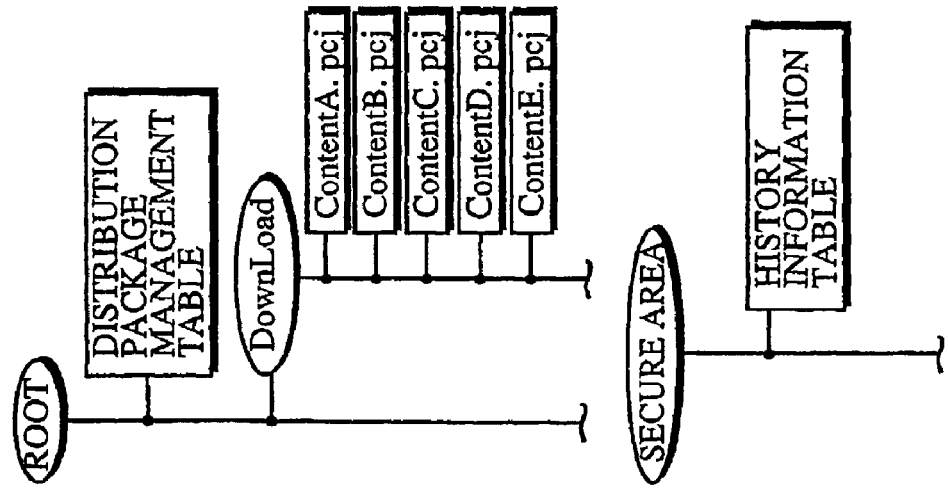

FIG. 21B  DISTRIBUTION PACKAGE MANAGEMENT TABLE

| INDEX NUMBER | FILE PATH | CONTENT INTRODUCTION INFORMATION |
|---|---|---|
| 001 | C:¥DownLoad¥ContentA.pcj | TITLE NAME, ARTIST NAME |
| 002 | C:¥DownLoad¥ContentB.pcj | TITLE NAME, ARTIST NAME |
| 003 | C:¥DownLoad¥ContentC.pcj | TITLE NAME, ARTIST NAME |
| 004 | C:¥DownLoad¥ContentD.pcj | TITLE NAME, ARTIST NAME |
| 005 | C:¥DownLoad¥ContentE.pcj | TITLE NAME, ARTIST NAME |

FIG. 21C

| NUMBER OF PERMITTED CHECK-OUTS A | 2 |
| NUMBER OF PERMITTED CHECK-OUTS B | 2 |
| NUMBER OF PERMITTED CHECK-OUTS C | 1 |
| NUMBER OF PERMITTED CHECK-OUTS D | 1 |
| NUMBER OF PERMITTED CHECK-OUTS E | 1 |

FIG. 21D  HISTORY INFORMATION TABLE

| | Media-ID | Content. ID |
|---|---|---|
| CHECK-OUT HISTORY INFORMATION A | AA1 | 001 |
| | AA2 | 001 |
| CHECK-OUT HISTORY INFORMATION B | AA1 | 002 |
| | AA2 | 002 |
| CHECK-OUT HISTORY INFORMATION C | AA1 | 003 |
| CHECK-OUT HISTORY INFORMATION D | AA1 | 004 |
| CHECK-OUT HISTORY INFORMATION E | AA1 | 005 |

FIG. 28
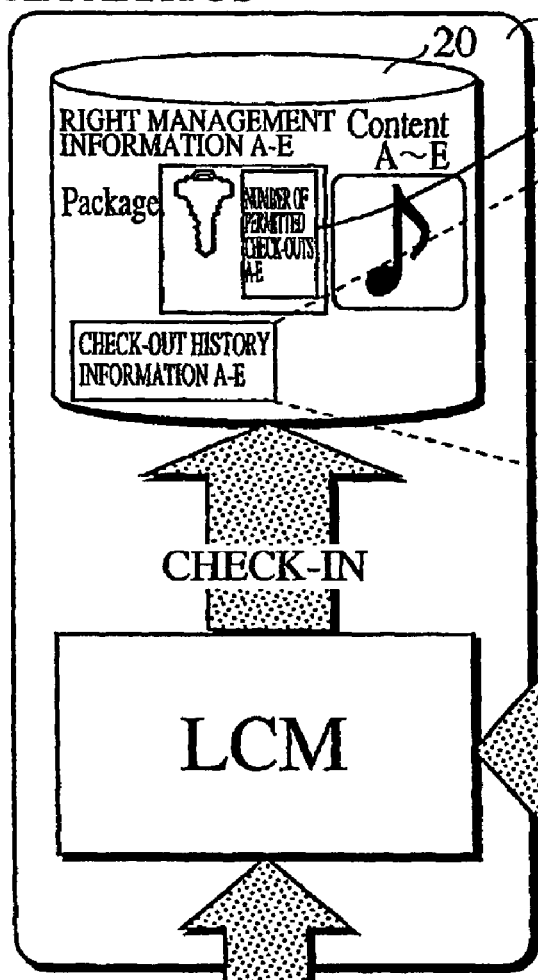
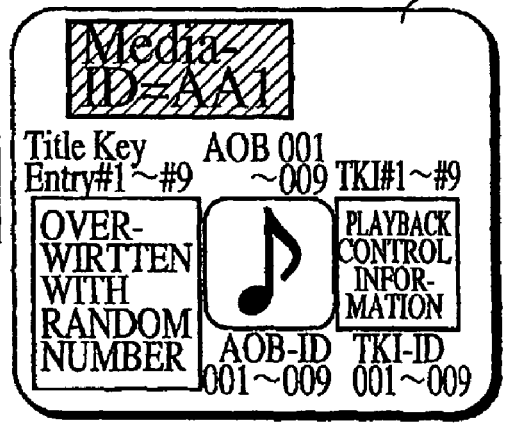
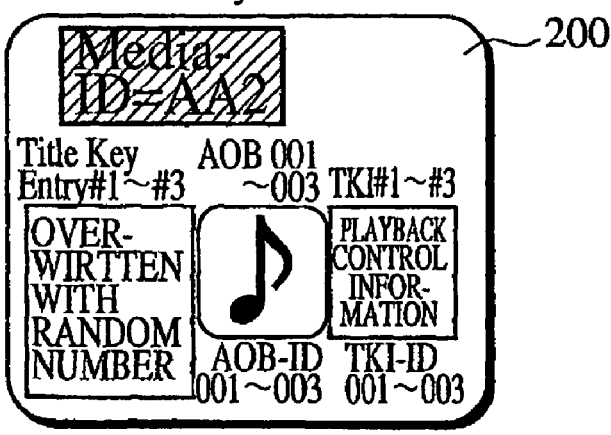

AUDIO DATA PLAYBACK MANAGEMENT SYSTEM AND METHOD WITH EDITING APPARATUS AND RECORDING MEDIUM

This application is a continuation-in-part under 35 U.S.C. § 120 of U.S. application Ser. No. 09/522,998 filed Mar. 9, 2000, now abandoned, and U.S. application Ser. No. 09/648, 873 filed Aug. 28, 2000, now abandoned, both of which are incorporated herein by reference.

FIELD OF THE INVENTION

The present invention relates to an audio data playback management system that includes a recording medium, an editing apparatus, and a management apparatus of managing protected contents that are copyrighted audio data. More particularly, the present invention relates to an improvement in the editing of audio data in a recording medium by an editing apparatus.

BACKGROUND OF THE INVENTION

In recent years, various copyright protection techniques for copyrighted digital audio materials have been established by SDMI (Secure Digital Music Initiative). According to the SDMI, copyrighted digital audio materials are converted into SDMI protected contents and are transmitted through the Internet. The SDMI protected contents are audio data that is protected against fraud and illegal playback by third parties, and the playback of the SDMI protected contents is managed by the audio data playback management system. Once copyrighted digital audio materials are converted into SDMI protected contents, only devices compliant with the SDMI can play back the SDMI protected contents. That is, devices that are not compliant with the SDMI cannot play back, let alone copy, the SDMI protected contents. Therefore, a special process called check-out needs to be performed to convert the SDMI protected contents into playable audio data. Check-out is performed by the stated management apparatus in the audio data playback management system. After obtaining an SDMI protected content via a network, the management apparatus performs check-out to convert the SDMI protected content into playable audio data, and records the audio data in a recording medium, such as a semiconductor memory card storing unique identification information. A playback apparatus plays back the audio data in the recording medium.

The number of times check-out can be performed (the number of permitted check-outs) is limited to a predetermined number, such as one, two, or three. Therefore, once check-out has been performed the number of permitted check-outs, the management apparatus prohibits further check-out and waits for check-in to be performed on the audio data in the recording medium. Check-in refers to a process of returning audio data, which has been set in a playable state, into a non-playable state. If check-in is performed on an SDMI protected content whose check-out is currently prohibited, the number of permitted check-outs for the SDMI protected content is incremented and check-out of the SDMI protected content becomes possible again.

To properly perform check-in, the management apparatus needs to judge whether audio data to be checked in from a recording medium is the same as that the management apparatus previously checked out to the recording medium. However, there is no conventional technique that uses an information system of managing check-out operations performed by devices. As a result, there may be cases where check-in is performed improperly on audio data in recording media. To solve this problem, techniques are recently proposed that manage check-out operations using identification information stored in recording media. The following is a description of how the correspondence between audio data is judged using the identification information in recording media. When check-out is performed to convert an SDMI protected content into playable audio data, the management apparatus assigns identification information (called a "track ID") to the audio data. The audio data assigned the track ID is managed as a track in a recording medium. The management apparatus then reads unique identification information (called a "media ID") from the recording medium and holds a pair of the track ID and the media ID as check-out history information.

If being instructed to check in the track recorded in the recording medium afterward, the management apparatus reads the media ID unique to the recording medium and the track ID assigned to the SDMI protected content from the recording medium and judges whether the pair of the read IDs matches the check-out history information. If the judgement result is affirmative, the management apparatus determines that the track to be checked in is audio data that the management apparatus previously checked out. In this case, the management apparatus sets the track in a non-playable state and increments the number of permitted check-outs for the SDMI protected content. If the judgement result is negative, check-in is not performed on the SDMI protected content.

With this technique, however, the management apparatus can properly perform check-in on a track recorded in a recording medium only if the correspondence between the track and an SDMI protected content is not changed. That is, if the track recorded in the recording medium has been edited and the correspondence between the track and the SDMI protected content is changed, the correspondence between the track and the SDMI protected content cannot be detected by referring the check-out history information described above. For instance, if the track in the recording medium is divided and a new track is generated, the new track is assigned a new track ID. In this case, even if the management apparatus attempts to check in the new track in the recording medium, it is judged that a pair of the track ID of the original track and the media ID of the recording medium matches the check-out history information and only the original track is set in a non-playable state. That is, it is judged that a pair of the new track ID and the media ID does not match the check-out history information, so that the new track assigned the new track ID is left in the recording medium as playable audio data. This makes it possible for an ill-intentioned user to illegally increment the number of permitted check-outs for the SDMI protected content. Therefore, there may be cases where the copyright to the SDMI protected content is infringed.

As described above, if a track checked out to a recording medium has been edited, the correspondence between tracks before and after the editing cannot be detected properly. As a result, an audio data playback management system conventionally needs to be produced according to one of (1) a specification where "check-in of tracks from recording media is allowed but the editing of the tracks is prohibited" and (2) a specification where "check-in of tracks from recording media is prohibited but the editing of the tracks is allowed". This imposes inconvenience on users with considerable frequency.

DISCLOSURE OF THE INVENTION

The first object of the present invention is to provide an audio data playback management system that properly performs check-in on audio data in a recording medium even if the audio data has been edited.

The second object of the present invention is to provide a recording medium having an information system that allows a management apparatus to uniquely identify each session called check-out.

The stated first object is achieved by an audio data playback management system including: a recording medium; a management apparatus that stores a permitted number, performs a check-out operation by (a) writing a first audio object with a first piece of identification information into the recording medium and (b) decrementing the permitted number, and performs a check-in operation by setting the first audio object in the recording medium in a non-playable state and incrementing the permitted number; and an editing apparatus that (c) edits the first audio object to obtain a second audio object and (d) writes the second audio object with a second piece of identification information into the recording medium, the second piece of identification information having an equivalence relation with the first piece of identification information, where the management apparatus performs a check-in operation on the second audio object corresponding to the second piece of identification information. This construction prevents a situation where although the second audio object obtained by the editing of a content remains in the recording medium, the number of permitted check-outs for the content is incremented.

Here, the editing by the editing apparatus is a division of the first audio object to obtain the second audio object, and the editing apparatus writes the second audio object with the second piece of identification information into the recording medium. With this construction, the second audio object is set in a non-playable state by a check-in operation. This prevents a situation where although the second audio object obtained by the division of the first audio object remains in the recording medium, a corresponding number of permitted check-outs is incremented.

Here, the management apparatus further includes: a first object ID writing unit operable to, when the first audio object is recorded, write a first object ID corresponding to the first audio object into the recording medium, and the editing apparatus further includes: a second object ID writing unit operable to, when the second audio object is obtained, write a second object ID into the recording medium, the second object ID corresponding to the second audio object and being different from the first object ID, where the management apparatus performs a check-in operation on the second audio object corresponding to the second object ID and the second piece of identification information. In the audio data playback management system having this construction, aside from content IDs, object IDs unique to audio objects are recorded in the recording medium. Therefore, the first audio object is distinguished from the second audio object obtained by the division of the first audio object. This makes it possible to perform playback and editing operations on respective audio objects.

Here, the management apparatus (1) holds a piece of check-out history information that includes media information unique to the recording medium and the first piece of identification information, and (2) performs a check-in operation on the second audio object that (i) is recorded in the recording medium assigned the media information in the piece of check-out history information and (ii) corresponds to the second piece of identification information having an equivalence relation with the first piece of identification information in the piece of check-out history information. In the audio data playback management system having this construction, even if the management apparatus and the editing apparatus use two or more recording media, no confusion is caused during check-in of audio objects in these recording media.

The stated second object is achieved by a recording medium for use in a system, the system including a management apparatus that performs check-out operations, each check-out operation being performed by (a) writing at least one audio object into a recording medium and (b) decrementing a permitted number, in the recording medium, a media ID is prestored and a first audio track has been recorded, the first audio track including a first audio object and a content ID, both of which have been written by one of the check-out operations; and the media ID being unique to the recording medium, where a pair of the media ID and the content ID uniquely specifies one of the check-out operations. This construction allows the management apparatus to uniquely specify a check-out operation using a pair of the media ID and the-content ID of an audio object in the recording medium. Therefore, check-in operations are properly performed on audio tracks that have been recorded in the recording medium by check-out operations.

BRIEF DESCRIPTION OF THE DRAWINGS

FIG. 13A shows the internal construction of a Title Key Entry;

FIG. 13B shows the internal construction of TKI;

FIG. 21A shows the directory and file structures of a local storage;

FIG. 21B shows an example of a distribution package management table;

FIG. 21C shows the example settings of numbers of permitted check-outs;

FIG. 21D shows an example of history information table;

FIG. 28 shows a state where the content management apparatus has performed check-in operations.

DESCRIPTION OF THE PREFERRED EMBODIMENTS

<First Embodiment>

Figure 1:
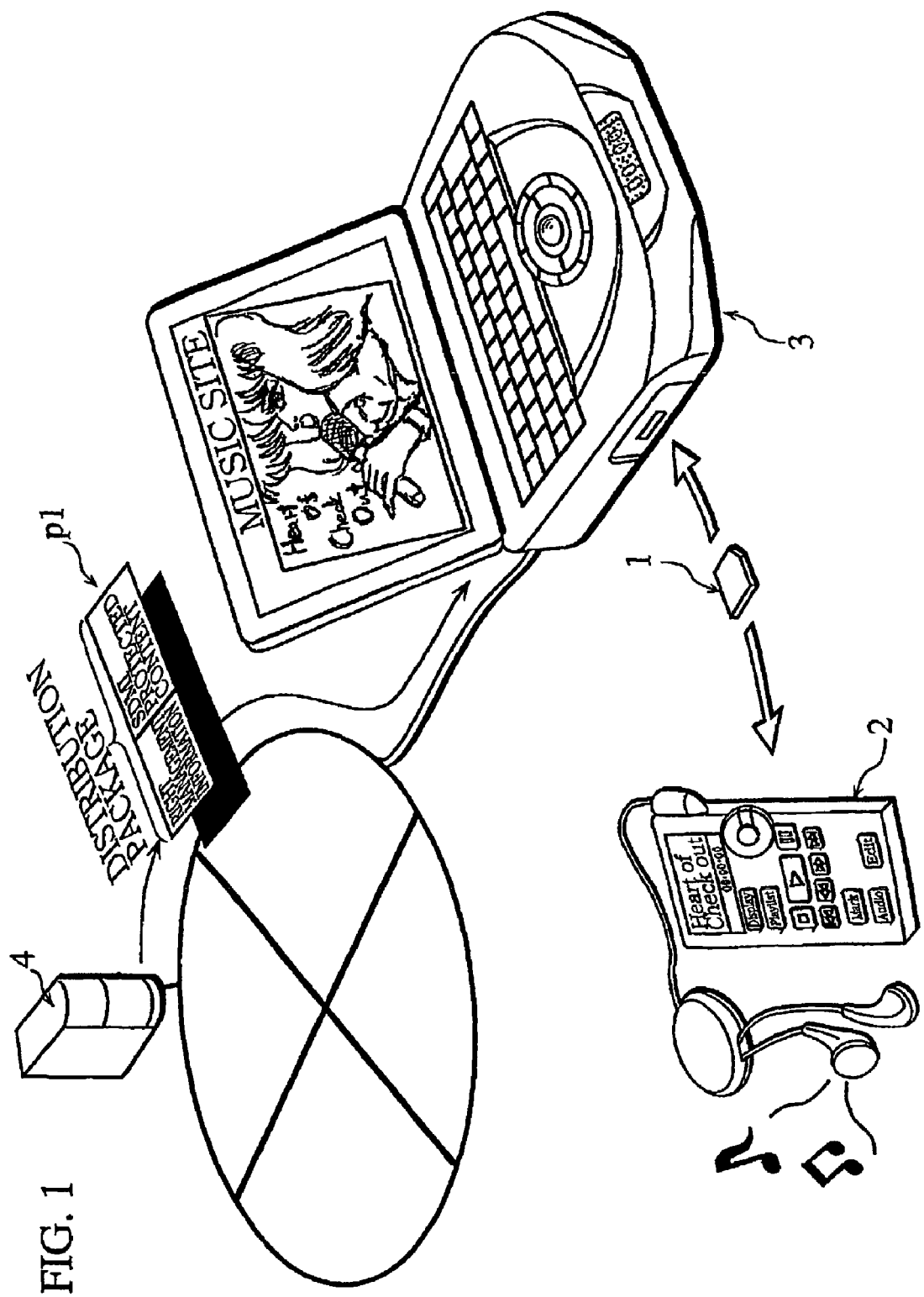
FIG. 1 shows the construction of an audio data playback management system of the first embodiment.

An audio data playback management system of the first embodiment is described below with reference to the drawings.

The audio data playback management system of the present embodiment creates a so-called "local SDMI environment" where a user can locally use SDMI protected contents (hereinafter simply referred to as "contents"). Each content is assigned an internationally unique ISRC (International Standard Recording Code) and is encrypted before being dealt with. The details of the SDMI are described in "SDMI Portable Device Specification" released Jun. 30, 1999, and so are not described here. It should be noted here that paragraphs below are given classification numbers "{x1-x2}".

The number of digits of a classification number represents the hierarchical depth of the item explained in a paragraph given the classification number. Also, of the classification number given to a paragraph, "x1" represents the drawing number of a drawing referred to in the paragraph and "x2" represents the reference number of a construction element explained in the paragraph.

{1-1,2,3}

Figure 2:
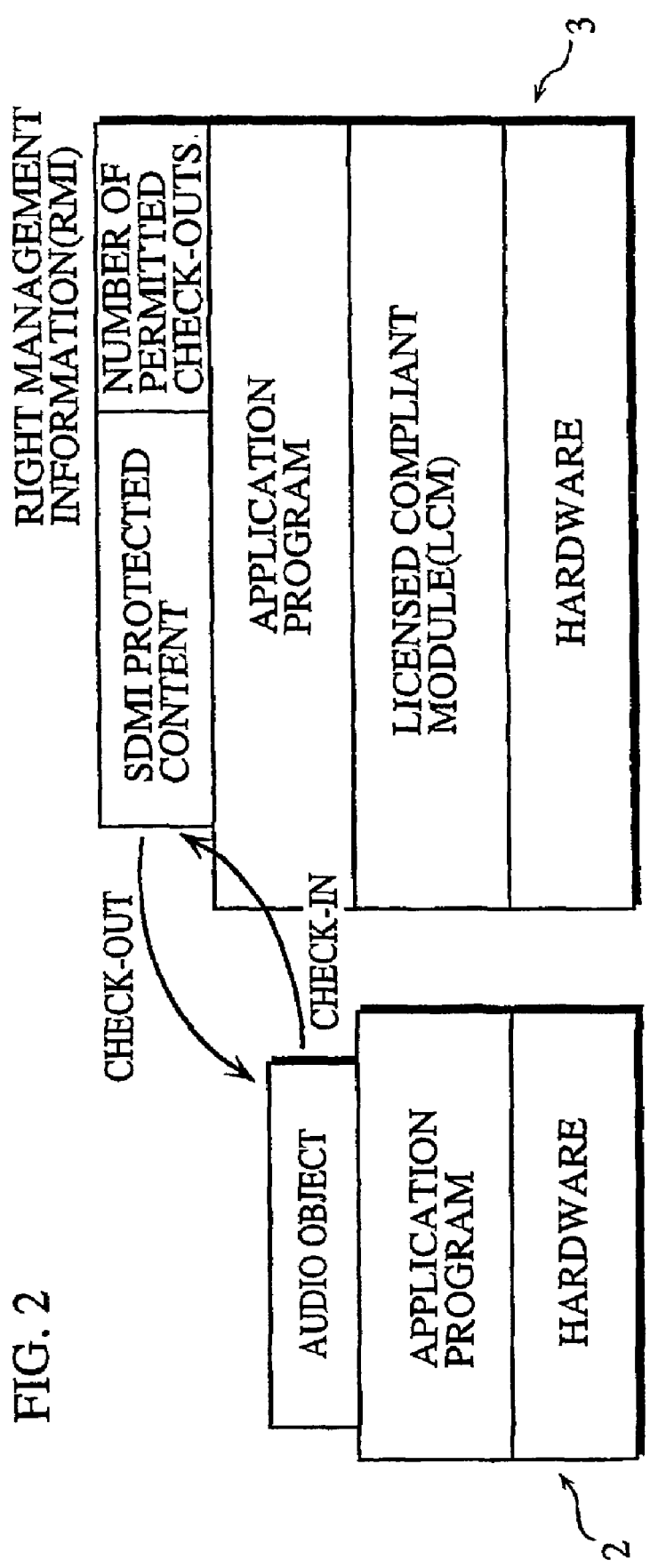
FIG. 2 shows a layer model of an editing and playback apparatus and a content management apparatus of the first embodiment.

FIG. 1 shows the construction of the audio data playback management system of the present embodiment. As shown in this drawing, the audio data playback management system includes a semiconductor memory card 1, in which audio data is recorded in a playable format, an editing and playback apparatus 2 that edits and plays back audio data, and a content management apparatus 3 that downloads a distribution package p1 (a pair of a content and right management information) from a distribution server 4 and performs check-in and check-out on the content according to the right management information. A layer model of the editing and playback apparatus 2 and the content management apparatus 3 is shown in FIG. 2. As shown in this drawing, the editing and playback apparatus 2 includes hardware and an application program, and the content management apparatus 3 includes hardware, a licensed compliant module, and an application program. Note that the critical difference between these apparatuses 2 and 3 is that the content management apparatus 3 includes the licensed compliant module that is not included in the editing and playback apparatus 2. The licensed compliant module is a software module that is capable of (1) downloading a content into the content management apparatus 3 and manages the downloaded content as the original of a content used in the local SDMI environment, (2) supplying the downloaded content to another place in the local SDMI environment for local use (performing check-out), and (3) returning the content, which has been supplied to the place in the local SDMI environment, to an original place in the content management apparatus 3 (performing check-in).

The SDMI protected content included in the distribution package is encrypted audio data and so is not playable in the local SDMI environment. The encryption key necessary to decrypt this audio data is included in the right management information. The right management information has been encrypted according to a public key cryptosystem and is decrypted only by the licensed compliant module. Therefore, a device (the editing and playback apparatus 2) that does not include the licensed compliant module cannot extract the encryption key from the right management information in the local SDMI environment. Without the encryption key, SDMI protected contents are non-playable audio data in the local SDMI environment (note that the right management information is decrypted by LCM on condition that a predetermined fee is paid to a copyright holder).

{2-1} Semiconductor Memory Card 1

Figure 3A:
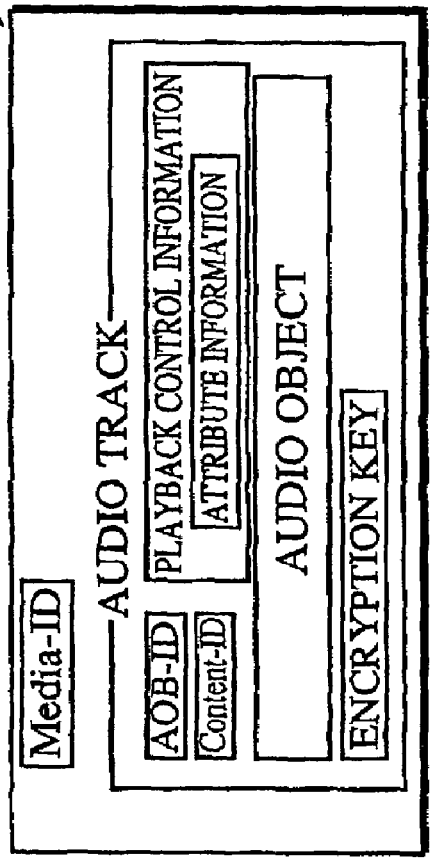
FIG. 3A shows the content of a semiconductor memory card.

The semiconductor memory card 1 is a portable media that records and carries audio data which is playable in the local SDMI environment. In the semiconductor memory card 1, the playable audio data is dealt with in units of audio objects (hereinafter simply referred to as the "AOBs"). Each AOB is encrypted audio data that is obtained by (a) encoding audio data with an audio compression codec (such as MP3 (MPEG1 Audio Layer3), Dolby AC-3 (Digital audio Compression), or AAC (Advanced Audio Coding)) and (b) encrypting the encoded audio data using a unique encryption key. FIG. 3A shows the content of the semiconductor memory card 1. As shown in this drawing, the semiconductor memory card 1 is assigned unique identification information called a "Media-ID" and records each audio object together with a 7-byte encryption key and playback control information corresponding to the audio object. The Media-ID is 8-byte identification information and is composed of a 1-byte ID uniquely assigned to the manufacturer of the semiconductor memory card 1 and a 7-byte number uniquely assigned to the recording medium.

Each encryption key necessary to decrypt an AOB is recorded in an area of the semiconductor memory card 1 that is accessible even by a device that does not include the licensed compliant module. Because each encryption key is recorded in such an area, each audio object is dealt with as playable audio data in the local SDMI environment. Each AOB is played back using a corresponding encryption key recorded in the semiconductor memory card 1. Therefore, each AOB in the semiconductor memory card 1 becomes non-playable if a corresponding encryption key in the semiconductor memory card 1 is overwritten with different data.

Each set of an AOB, an encryption key, and playback control information is called an audio track (hereinafter simply referred to as the "track"). The editing and playback apparatus 2 performs playback and editing operations for respective tracks. There are also tracks, each of which includes a plurality of AOBs, a plurality of encryption keys, and playback control information. Therefore, the playback control information includes attribute information showing whether a corresponding AOB constitutes an independent track, the first (or head) part of a track, a middle part of a track, or the end part of a track. Each AOB is assigned a unique AOB-ID that is a number between 001 and 999, and is uniquely identified with the AOB-ID in the semiconductor memory card 1. In addition to the AOB-ID, each AOB is assigned a Content-ID. As described above, each AOB is audio data corresponding to a content. Therefore, each Content-ID is used to distinguish an AOB generated by performing a check-out operation on a content from an AOB generated by performing a check-out operation on a different content. Each Content-ID is also used to distinguish an AOB generated by performing a check-out operation on a content from an AOB generated by performing another check-out operation on the same content. Like the AOB-IDs, each Content-ID is a number between 001 and 999. Each pair of a Media-ID and a Content-ID specifies one of check-out operations performed by the content management apparatus 3. Also, tracks recorded in the semiconductor memory card 1 are distinguished from each other with unique identification information (called track IDs) assigned to the tracks. In this embodiment, alphabets "A, B, C, D, . . ." are used as track IDs and tracks assigned the track IDs "A, B, C, D, . . ." are referred to as "Track.A, Track.B, Track.C, Track.D, . . .".

{3-2} Editing and Playback Apparatus 2

Figure 3B:
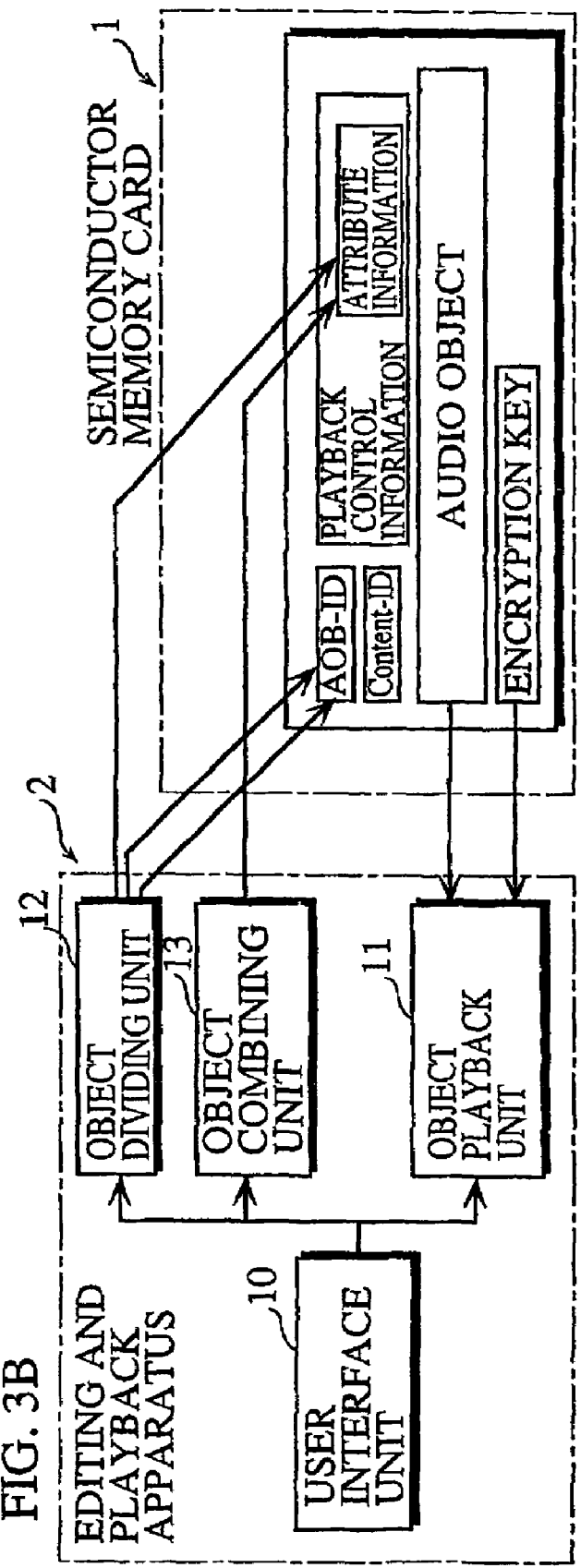
FIG. 3B shows the functional construction of the editing and playback apparatus.

The editing and playback apparatus 2 is a portable editing apparatus having a playback function. That is, the editing and playback apparatus 2 receives tracks from the licensed compliant module in the content management apparatus 3 via the semiconductor memory card 1, and plays back and edits the tracks. FIG. 3B shows the functional construction of the editing and playback apparatus 2. As shown in this drawing, the editing and playback apparatus 2 includes a user interface unit 10, an object playback unit 11, an object dividing unit 12, and an object combining unit 13.

{3-10} User Interface Unit 10

The user interface unit 10 includes a display that displays a list of tracks recorded in the semiconductor memory card 1, a jog dial, and various keys. With this construction, the user interface unit 10 provides an operator with various information and receives various instructions from the operator.

{3-11} Object Playback Unit 11

If the user interface 10 receives a request to play back AOBs, the object playback unit 11 obtains the AOBs and corresponding encryption keys, decrypts the AOBs using the encryption keys, and plays back the decrypted AOBs. On the other hand, if the user interface 10 receives a request to perform trick play, such as forward quick scan or reverse quick scan, on AOBs, the object playback unit 11 performs the trick play by referring to the playback control information.

{3-12} Object Dividing Unit 12

The object dividing unit 12 divides tracks specified by the operator. If the operator inputs an instruction to divide a track, the object dividing unit 12 sets an editing point for the track according to the operation of the jog dial by the operator. The editing point is expressed using a relative time that is determined with reference to the start of a corresponding AOB. After the setting of the editing point, the editing and playback apparatus 2 divides the AOB at the editing point into two parts. During this operation, the editing and playback apparatus 2 assigns a Content-ID and AOB-ID that are the same as those of the original AOB to the former part between the start of the AOB to the editing point. Also, the editing and playback apparatus 2 assigns a Content-ID that is the same as that of the original AOB and a new AOB-ID to the latter part between the editing point and the end of the AOB. After the new AOB-ID is assigned to an AOB corresponding to the latter part, the editing and playback apparatus 2 generates playback control information and an encryption key corresponding to the new AOB-ID and records the information and key in the semiconductor memory card 1. The AOB assigned the new AOB-ID is managed as one track together with the corresponding playback control information and encryption key in the semiconductor memory card 1. In this manner, the division of tracks specified by the operator is performed.

(12.i) It should be noted here that although assigned an AOB-ID different from that of the original AOB, the new AOB generated by the division of the original track is assigned a Content-ID that is the same as that of the original AOB. That is, although different AOB-IDs are assigned to the AOBs corresponding to the former part and the latter part of the original AOB, the same Content-ID is assigned to these AOBS. Therefore, if it is requested to perform check-in on these AOBs, the content management apparatus 3 instantly recognizes that these AOBs are generated by dividing the original AOB.

{3-13} Object Combining Unit 13

The object combining unit 13 combines tracks according to an operator's instruction received by the user interface unit 10. If two AOBs are recorded in the semiconductor memory card 1 and the user interface unit 10 receives an operator's instruction to combine these AOBs, the object combining unit 13 updates the attribute information included in the playback control information in corresponding tracks to show that one of these AOBs is the former part of a track and the other of these AOBs is the latter part of the track. In this manner, the object combining unit 13 combines two tracks into a single track.

{4-3} Content Management Apparatus 3

Figure 4:
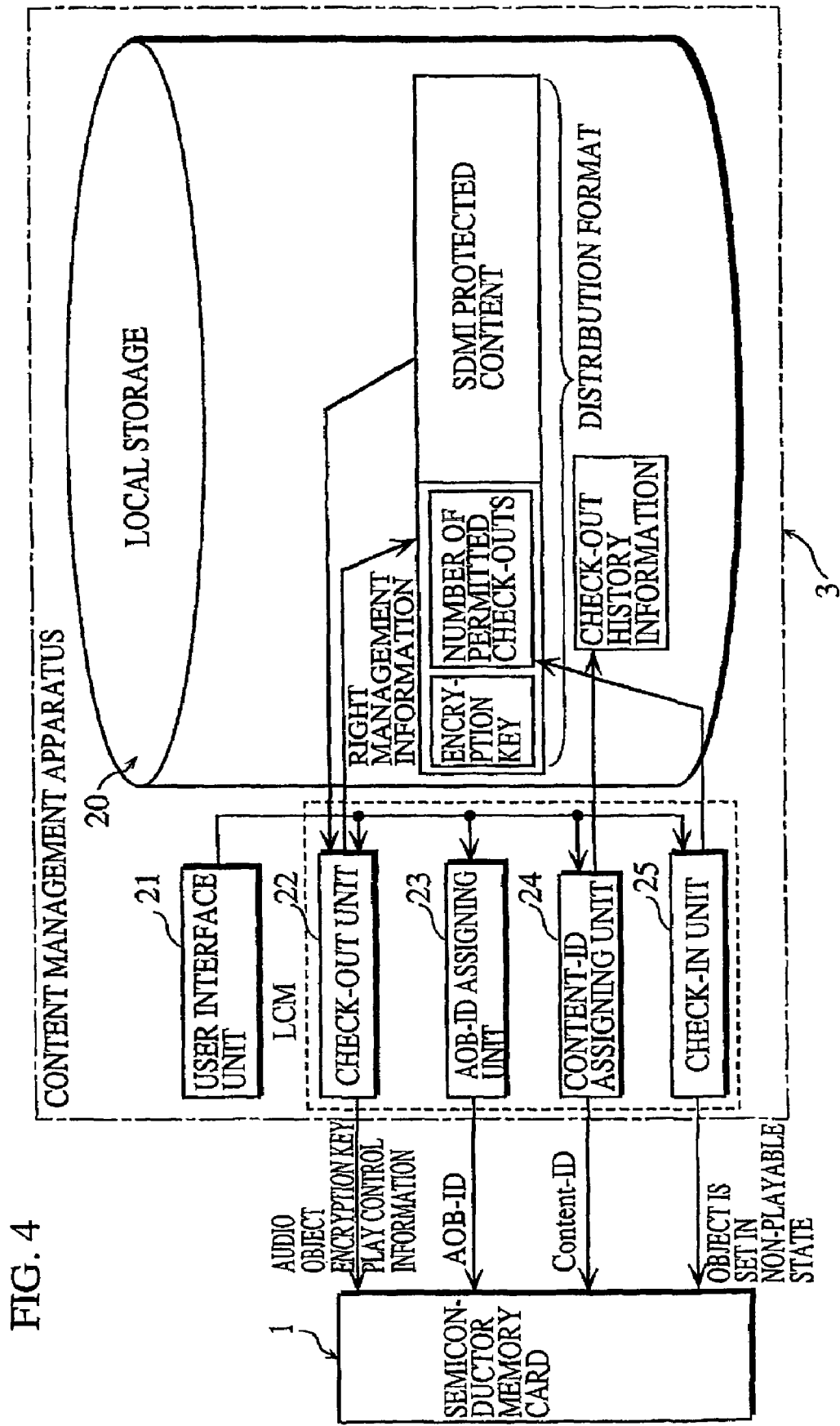
FIG. 4 is the functional block diagram showing the internal construction of the content management apparatus.

The content management apparatus 3 is a personal computer including hardware compliant with the SDMI, an application program compliant with the SDMI, and a licensed compliant module functioning as an interface between the hardware and application program. FIG. 4 is the functional block diagram showing the construction of the content management apparatus 3 equipped with the licensed compliant module. As shown in this drawing, the content management apparatus 3 includes a local storage 20, a user interface unit 21, a check-out unit 22, an AOB-ID assigning unit 23, a Content-ID assigning unit 24, and a check-in unit 25.

{4-20} Local Storage 20

The local storage 20 is an internal disk apparatus that stores a plurality of distribution formats. Each distribution format is the format for distributing an SDMI protected content via a network such as the Internet. The right management information of each distribution format includes various data, such as the encryption key used to encrypt a corresponding content and the number of permitted check-outs corresponding to the content, that must not be manipulated by a user.

{4-21} User Interface Unit 21

The user interface unit 21 includes a display that displays a list of contents stored in the local storage 20 and a pointing device such as a combination of a keyboard and a mouse. With this construction, the user interface unit 21 displays various information for the operator and receives various instructions from the operator.

{4-22} Check-Out Unit 22

The check-out unit 22 converts contents stored in the local storage 20 into AOBs and records the AOBs in the semiconductor memory card 1. More specifically, if the semiconductor memory card 1 is connected to the content management apparatus 3 and the operator selects a content to be checked out, the check-out unit 22 judges whether the playback time of the selected content exceeds a predetermined length of time.

(22.i) The check-out unit 22 makes this judgement to suppress the size of playback control information corresponding to the AOB (the selected content). The reason for this is as follows. The playback control information includes a time map table showing a plurality of entry points that are referred to when the editing and playback apparatus 2 intermittently reads an AOB at intervals of two seconds. The shorter the playback time of an AOB, the smaller the number of entry points becomes. Therefore, the size of the time map table is reduced. On the other hand, the longer the playback time of an AOB, the larger the number of entry points becomes. Therefore, the size of the time map table is increased. Because the time map table, which is referred to by the editing and playback apparatus 2 during forward quick scan or reverse quick scan, is resident in a memory, it is desirable that the size of the time map table is reduced to make the most effective use of the limited capacity of the memory.

(22.ii) For the reason described above, the check-out unit 22 judges whether the playback time of the AOB to be recorded in the semiconductor memory card 1 exceeds the predetermined length of time prior to the check-out of the selected content. If the judgement result is negative, the check-out unit 22 records audio data corresponding to the selected content as a single AOB in the semiconductor memory card 1. If the judgement result is affirmative, the check-out unit 22 divides the corresponding audio data into a plurality of AOBs and records the AOBs in the semiconductor memory card 1. In this manner, even if the playback time of the original content exceeds the predetermined length of time, the playback time of each AOB obtained by dividing the original content does not exceed the predetermined length of time. Therefore, the size of a time map table corresponding to each obtained AOB can be suppressed. After recording an AOB, the check-out unit 22 records an encryption key and playback control information corresponding to the selected content in the semiconductor memory card 1 so that the AOB is associated with the encryption key and playback control information. As a result, even if a content is divided into a plurality of AOBs, the AOBs form a single track with corresponding playback control information and encryption keys in the semiconductor memory card 1. This maintains a one-to-one correspondence between a content stored in the content management apparatus 3 and a track recorded in the semiconductor memory card 1, regardless of whether the content is recorded as a single AOB or a plurality of AOBs.

{4-23} AOB-ID Assigning Unit 23

The AOB-ID assigning unit 23 assigns an AOB-ID that is unique in the semiconductor memory card 1 to each AOB generated from a content prior to the recording of the AOB. The procedure for assigning an AOB-ID to each AOB to be recorded is described in detail below. The AOB-ID assigning unit 23 checks which ones of numbers 001–999 that are available as AOB-IDs have already been assigned in the semiconductor memory card 1. As a result of this operation, the AOB-ID assigning unit 23 finds, for instance, that seven AOBs are stored in the semiconductor memory card 1 and AOB-IDs 001–007 are assigned to these AOBs. The AOB-ID assigning unit 23 then selects one of the unassigned numbers 008–999 and assigns an AOB-ID (the selected number) to the AOB to be recorded in the semiconductor memory card 1. If a content to be recorded corresponds to three AOBs, the AOB-ID assigning unit 23 selects three numbers 008, 009, and 010 from the unassigned numbers 008–999 and assigns the selected numbers to the AOBs. If numbers 001, 002, 004, and 006–010 have already been assigned to AOBs in this case, the AOB-ID assigning unit 23 selects three discontinuous numbers (such as 003, 005, and 011) from the unassigned numbers 003, 005, and 011–999 and assigns the selected numbers to the AOBs.

{4-24} Content-ID Assigning Unit 24

The Content-ID assigning unit 24 assigns a Content-ID to each AOB generated by dividing a content before each generated AOB is recorded in the semiconductor memory card 1. Like the AOB-ID assigning unit 23, the Content-ID assigning unit 24 checks which ones of numbers 001–999 that are available as Content-IDs have already been assigned in the semiconductor memory card 1. As a result of this operation, the Content-ID assigning unit 24 finds how Content-IDs are currently assigned in the semiconductor memory card 1. For instance, the Content-ID assigning unit 24 finds that numbers 001–005 have already been assigned and numbers 006–999 are unassigned.

(24.i) After finding how Content-IDs are currently assigned, the Content-ID assigning unit 24 selects one of the unassigned numbers and assigns the selected number to each AOB corresponding to a content to be recorded. If numbers 006–999 are unassigned, for instance, the Content-ID assigning unit 24 selects a number 006 as a Content-ID and assigns the selected number to each AOB. Also, if discontinuous numbers 002, 004, and 006 have already been assigned to AOBs and so discontinuous numbers 003, 005, and 007–999 remain unassigned, for instance, the Content-ID assigning unit 24 selects a number 003 as a Content-ID and assigns the selected number to each AOB corresponding to the content. It should be noted here that the critical difference between Content-IDs and AOB-IDs is that even if a plurality of AOBs should be recorded, the same Content-ID is assigned to the AOBs. That is, even if a plurality of AOBs are generated from the same content, the same Content-ID is assigned to the plurality of AOBs. After the Content-ID assigning unit 24 assigns a Content-ID to each AOB that should be recorded, the content management apparatus 3 reads the Media-ID from the semiconductor memory card 1 and stores a pair of the read Media-ID and the assigned Content-ID in the local storage 20 as history information.

By referring to pairs of Content-IDs and Media-IDs, the content management apparatus 3 detects the correspondences between contents in the semiconductor memory card 1 and those in the local storage 20, and finds how Content-IDs are assigned.

(24.ii) Because Content-IDs are assigned in the manner described above, the following things can be said in the case where the same content is to be checked out to the same semiconductor memory card twice. Suppose that numbers 001–005 have already been assigned and it is requested to check out a content. In this case, an assigned number 006 is selected and is assigned to each AOB corresponding to the content. When it is requested to check out the same content again, a number 007 is selected from unassigned numbers 007–999 and is assigned to each AOB corresponding to the content. Therefore, in the case where the same content is checked out twice and two sets of AOBs corresponding to the content are stored in the semiconductor memory card 1, these sets of AOBs are respectively assigned Content-IDs 006 and 007. This makes it possible to distinguish between these two sets of AOBs in the semiconductor memory card 1.

{4-25} Check-In Unit 25

If the content management apparatus 3 is connected to the semiconductor memory card 1 and is requested to check in a content from the semiconductor memory card 1, the check-in unit 25 reads the Media-ID and a Content-ID assigned to each AOB corresponding to the content from the semiconductor memory card 1. The check-in unit 25 then judges whether the history information in the local storage 20 includes a pair of a Media-ID and a Content-ID that are the same as those read from the semiconductor memory card 1. If the judgement result is affirmative, the check-in unit 25 sets each AOB assigned the Content-ID in a non-playable state. As a result, even if there are a plurality of AOBs assigned the same Content-ID in the semiconductor memory card 1, all of these AOBs are set in a non-playable state. This is because although being dealt with as independent AOBs in the semiconductor memory card 1, all of these AOBs correspond to the same content and should be set in a non-playable state by a check-in operation. After performing check-in to set each AOB assigned the Content-ID in a non-playable state, the check-in unit 25 increments a corresponding number of permitted check-outs and deletes the pair of the Media-ID and Content-ID from the history information. As a result, the content returns to a state before the check-out operation and it becomes possible to check out the content again. Even if AOBs assigned the same Content-ID are divided or combined with other AOBs by an editing operation, the AOBs return to the original state and are set in a non-playable state.

The internal construction of the content management apparatus 3 has been described above. Next, the Content-ID, AOB-ID, and ISRC given to a content are compared with each other.

The AOB-ID is the same as the Content-ID in that these IDs are selected from numbers unassigned in the semiconductor memory card 1.

If a plurality of AOBs are generated from a content and are stored in the semiconductor memory card 1, the AOBs are assigned different AOB-IDs but are assigned the same Content-ID. Also, if a single AOB stored in the semiconductor memory card 1 is divided into a plurality of AOBS, these AOBs are assigned different AOB-IDs but are assigned the same Content-ID.

As described above, AOB-IDs and Content-IDs differ from each other in sameness before and after the division of AOBs. That is, although the sameness of AOB-IDs is not maintained after the division of an AOB, the sameness of Content-IDs is maintained even after the division.

Like Content-IDs, the sameness of ISRCs is maintained before and after the division of AOBs. This is because each ISRC is an international identification information used to identify a content and is not changed regardless of how AOBs are combined and divided. As a result, if the content management apparatus 3 performs check-out on the same content twice, the ISRC of each AOB recorded by the latter check-out operation is not changed from that of each AOB recorded by the former check-out operation. This makes it impossible that the AOBs are distinguished from each other merely by referring to the ISRCs. However, as described above, if check-out is performed on the same content twice and two sets of AOBs corresponding to the content are recorded in the semiconductor memory card 1, different Content-IDs are assigned to these sets of AOBs. Therefore, if it is requested to check in the content from the semiconductor memory card 1, the check-in unit 25 sets each AOB recorded by the former check-out operation in a non-playable state and leaves each AOB recorded by the latter check-out operation in a playable state.

As described above, unlike AOB-IDs and ISRCs, Content-IDs uniquely specify AOBs checked out to the semiconductor memory card 1.

Figure 5A:
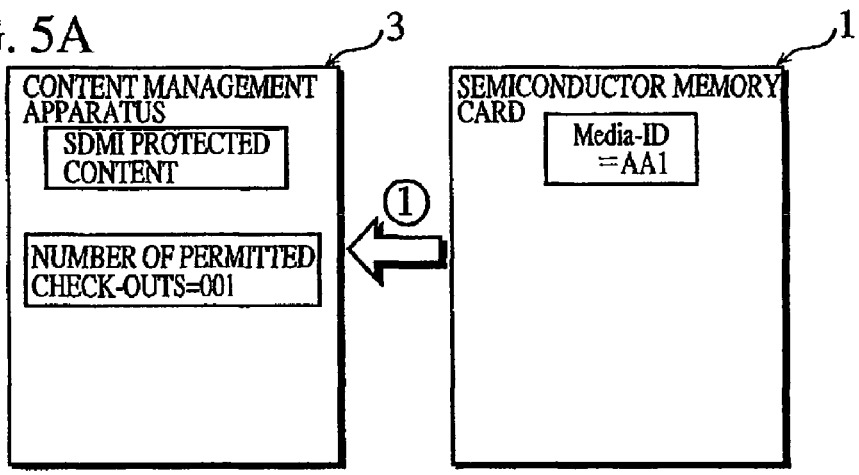
FIGS. 5A–5D show the first example of the processing by the audio data playback management system.

The first example of the processing by the audio data playback management system having the stated construction is described below with reference to FIGS. 5A–5D and 6A–6C. These drawings show the outline of the processing by the audio data playback management system in the first example. FIG. 5A shows an initial state where the content management apparatus 3 stores a content and a corresponding number of permitted check-outs "001". Also, the semiconductor memory card 1 is assigned a Media-ID "AA1". It should be noted here that in this example, each content corresponds to a single AOB unless otherwise specified. If the content management apparatus 3 receives an operator's request to perform check-out on the content stored in the local storage 20 under this condition, the AOB-ID assigning unit 23 assigns an AOB-ID "001" to an AOB that should be stored and the Content-ID assigning unit 24 assigns a Content-ID "001" to the AOB, as shown by the arrow ① in FIG. 5B. The AOB assigned the AOB-ID "001" is identified as "AO001" in the semiconductor memory card 1. Following this, as shown by the arrow ② in FIG. 5B, the content is recorded in the semiconductor memory card 1 as an AOB. At the same time, an encryption key and playback control information corresponding to the AOB are stored in the semiconductor memory card 1. In this manner, Track.A is recorded in the semiconductor memory card 1.

Figure 5B:
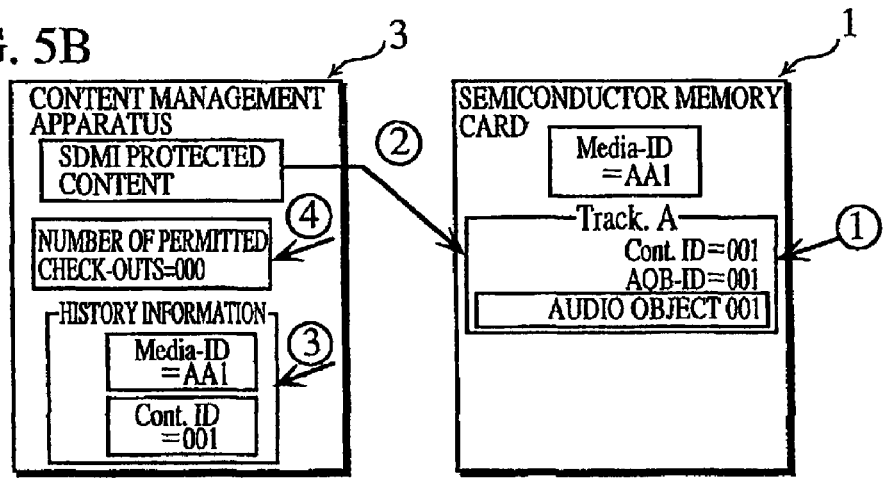
Figure 5C:
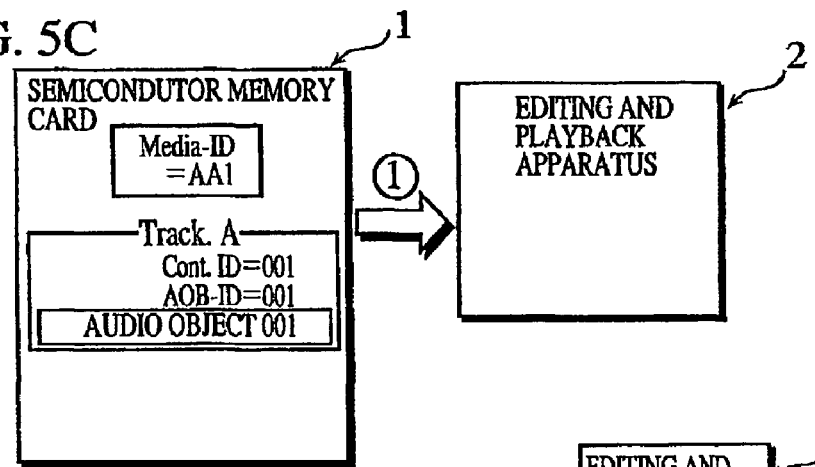

Then, as shown by the arrow ③ in FIG. 5B, the Content-ID assigning unit 24 reads the Media-ID "AA1" from the semiconductor memory card 1 and stores a paired Media-ID "AA1" and Content-ID "001" as history information in the local storage 20. Finally, as shown by the arrow ④ in FIG. 5B, the number of permitted check-outs given by the right management information is decremented to "000". This completes the check-out operation. After that, as shown by the arrow ① in FIG. 5C, the semiconductor memory card 1 is ejected from the content management apparatus 3 and is connected to the editing and playback apparatus 2.

Figure 5D:
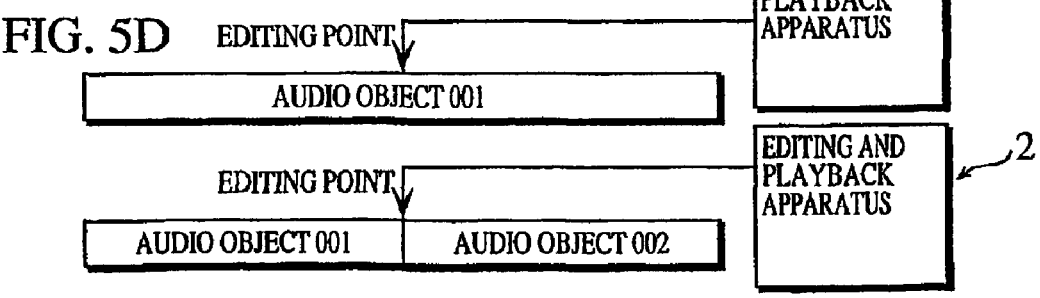

FIG. 5D shows a state where an AOB recorded in the semiconductor memory card 1 is divided into two AOBs by the editing and playback apparatus 2. As shown in this drawing, the object dividing unit 12 sets an editing point for the AOB to divide the AOB into two AOBs. As shown by the arrow ① in FIG. 6A, after the AOB is divided and a new AOB is generated, an unassigned AOB-ID "002" is assigned to the new AOB. Also, as shown by the arrow ② in FIG. 6A, the Content-ID "001" of the original AOB is assigned to AOB002. Following this, an encryption key and playback control information are generated for AOB002 and a new track "Track.B" is obtained in the semiconductor memory card 1.

Figure 6A:
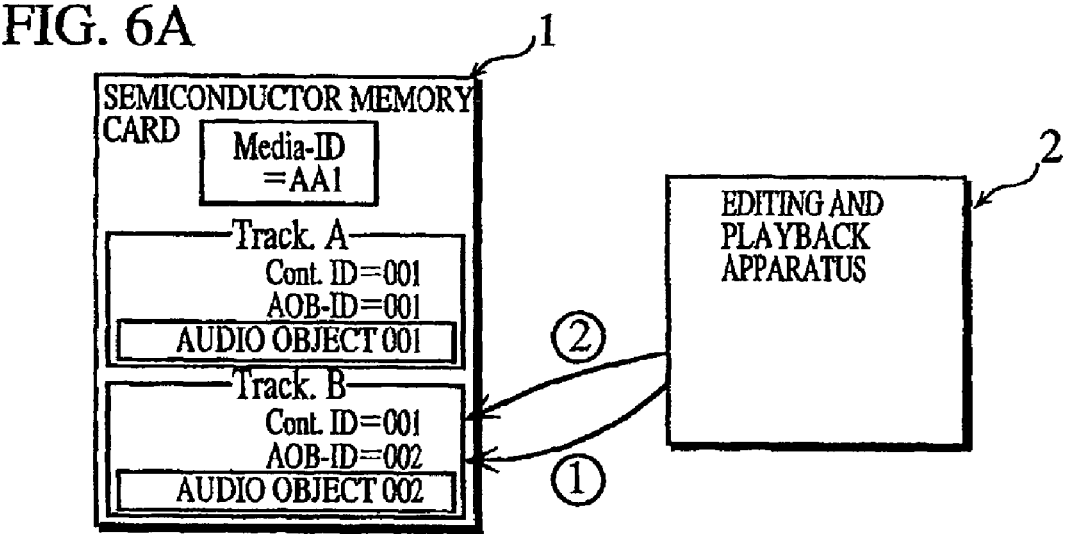
FIGS. 6A–6C show the first example of the processing by the audio data playback management system.
Figure 6B:
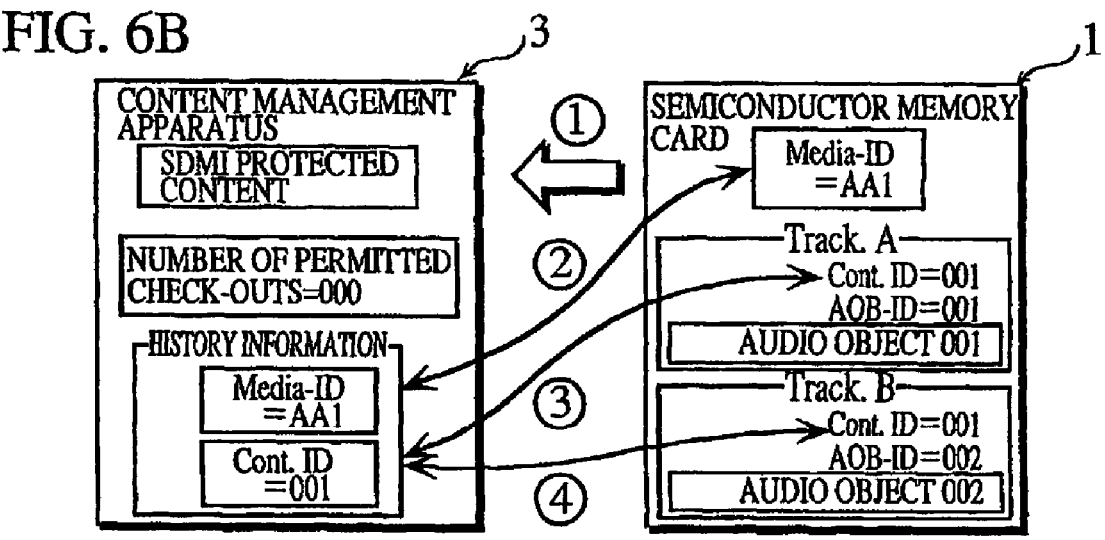
Figure 6C:
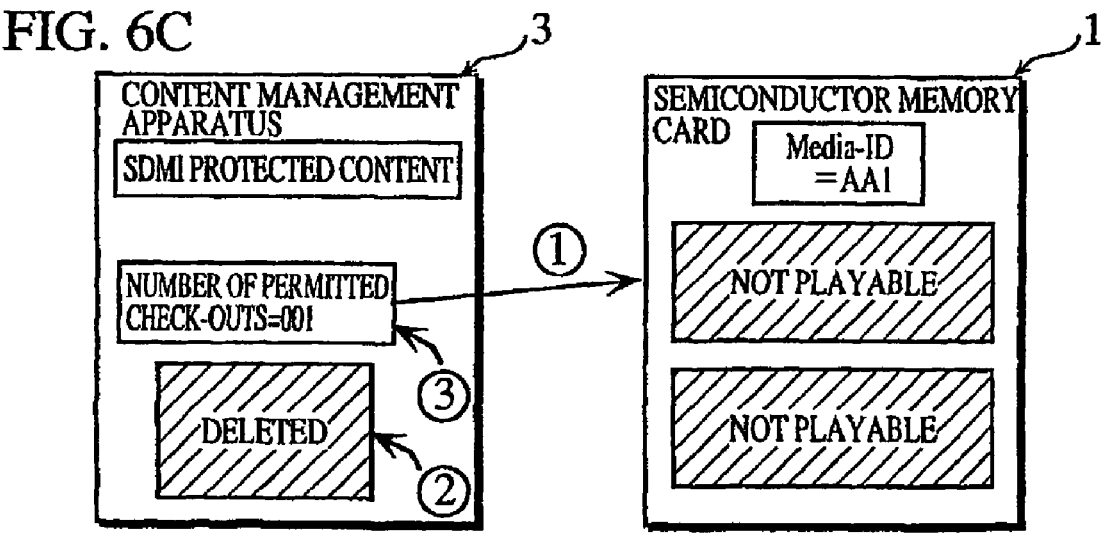

FIG. 6B shows a state where a content is checked in from the semiconductor memory card 1. Suppose that the semiconductor memory card 1 that stores two AOBs obtained by an editing operation is connected to the content management apparatus 3 again (as shown by the arrow ① in FIG. 6B) and it is requested to perform check-in on a content. The local storage 20 of the content management apparatus 3 stores a paired Media-ID "AA1" and Content-ID "001" as history information. Therefore, as shown by the arrows ②, ③, and ④ in FIG. 6B, the check-in unit 25 detects each AOB assigned the Content-ID "001" shown by the history information by referring to the Media-ID given to the semiconductor memory card 1 and the Content-ID assigned to each AOB. Because the semiconductor memory card 1 stores two AOBs assigned the Content-ID "001", the check-in unit 25 sets these AOBs in a non-playable state (as shown by the arrow ① in FIG. 6C), deletes history information including the paired Media-ID "AA1" and Content-ID "001" (as shown by the arrow ② in FIG. 6C), and increments the number of permitted check-outs to "001" (as shown by the arrow ③ in FIG. 6C). The first example of the processing by the audio data playback management system has been described above.

Figure 7A:
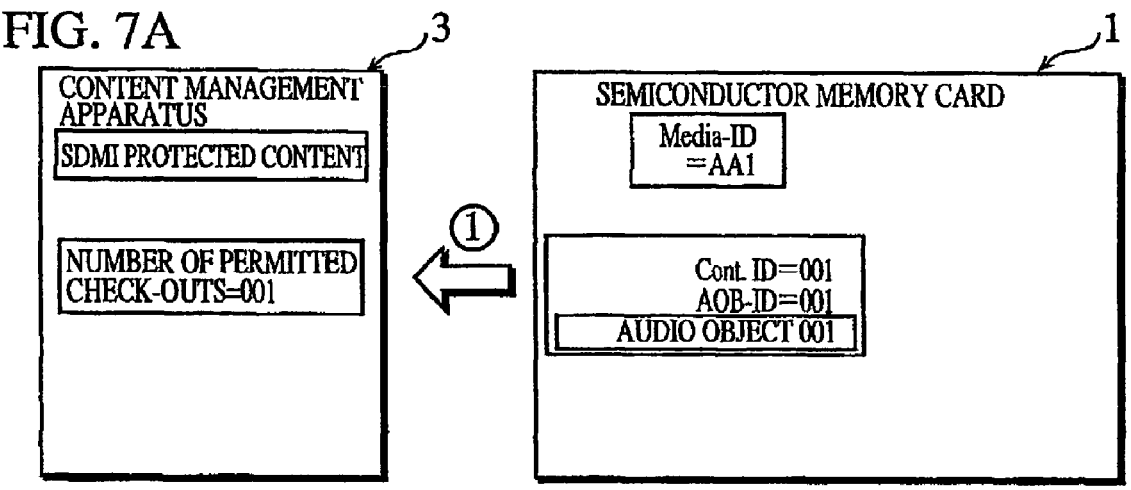
FIGS. 7A–7C show the second example of the processing by the audio data playback management system.
Figure 7B:
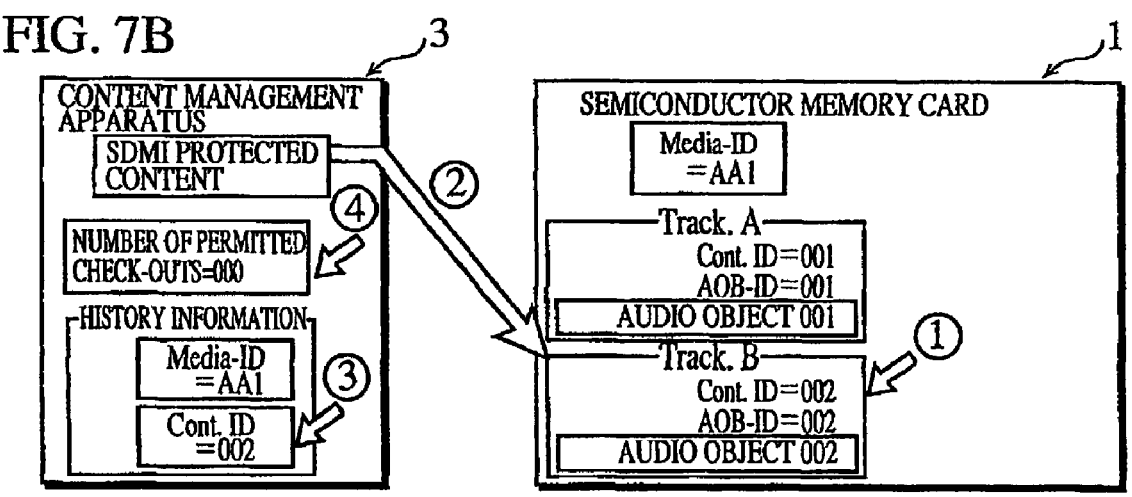
Figure 7C:
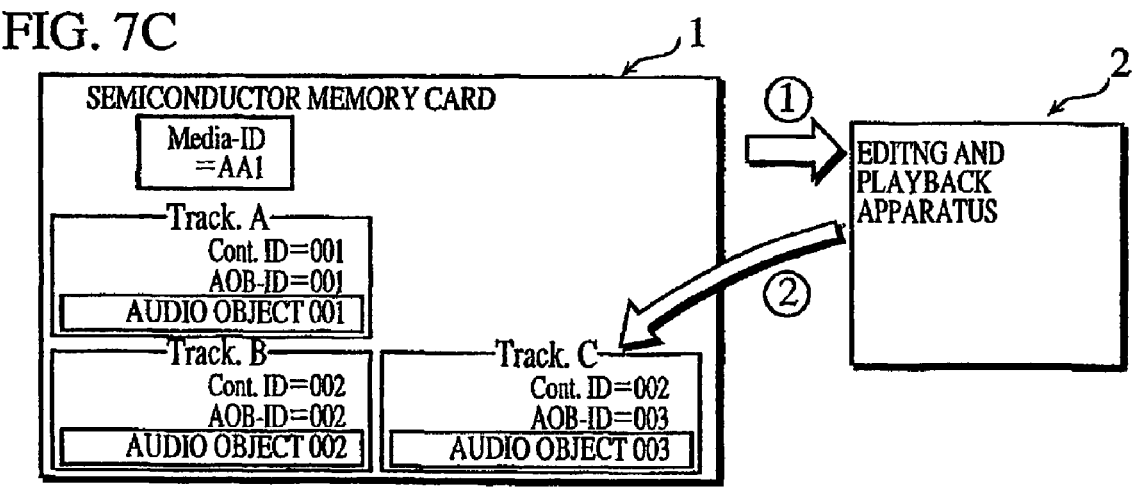

The second example of the processing by the audio data playback management system is described below with reference to FIGS. 7A–7C and 8A–8C. The audio data playback management system of this example is an advanced type of that described in the first example. FIGS. 7A–7C show the outline of the processing by this audio data playback management system in this example. Like FIG. 5A, FIG. 7A shows a state where the content management apparatus 3 stores a content and a corresponding number of permitted check-outs "001" and the semiconductor memory card 1 is given a Media-ID "AA1". The difference between FIGS. 5A and 7A is that the semiconductor memory card 1 in FIG. 7A prestores an AOB that is assigned an AOB-ID "001" and a Content-ID "001". Note that because this "AOB001" is not an AOB checked out by the content management apparatus 3, the content management apparatus 3 should not check in this AOB. Also, like in the first example, each content in this example corresponds to a single AOB.

If the semiconductor memory card 1 is connected to the content management apparatus 3 as shown by the arrow ① in FIG. 7A and the content management apparatus receives an operator's request to check out the content, the AOB-ID assigning unit 23 assigns an AOB-ID "002" to an AOB to be recorded and the Content-ID assigning unit 24 assigns a Content-ID "002" to the AOB, as shown by the arrow ① in FIG. 7B. Then, the content is converted into an AOB and is recorded in the semiconductor memory card 1 as shown by the arrow ② in FIG. 7B. At the same time, an encryption key and playback control information corresponding to the AOB are recorded in the semiconductor memory card 1.

In this manner, "Track. B" is recorded in the semiconductor memory card 1. Following this, as shown by the arrow ③ in FIG. 7B, the Content-ID assigning unit 24 reads the Media-ID "AA1" from the semiconductor memory card 1 and stores the Media-ID in the local storage 20 together with the Content-ID "002" as history information. Finally, as shown by the arrow ④ in FIG. 7B, the number of permitted check-outs given by the right management information is decremented to "000". This completes the check-out operation.

After that, as shown by the arrow ① in FIG. 7C, the semiconductor memory card 1 is ejected from the content management apparatus 3 and is connected to the editing and playback apparatus 2. The object dividing unit 12 of the editing and playback apparatus 2 sets an editing point for AOB002 to divide the AOB into two AOBs. As shown by the arrow ② in FIG. 7C, a new AOB generated by dividing the original AOB002 is assigned an unassigned AOB-ID "003" and the Content-ID "002" of the original AOB.

Following this, an encryption key and playback control information are generated for AOB003 and a new track "Track.C" is obtained in the semiconductor memory card 1. Then, the object combining unit 13 of the editing and playback apparatus 2 combines "Track.B" including AOB002 with "Track.A" including AOB001 to generate a new track "Track.A", as shown by the arrow ① in FIG. 8A. When doing so, the object combining unit 13 updates the attribute information included in the playback control information in the combined tracks as shown by the arrows ② and ③ in FIG. 8A. The updated attribute information gives "Head of Track.A" showing that the corresponding track forms the head part of new Track.A and "End of Track.A" showing that the corresponding track forms the end part of new Track.A. As a result, in the semiconductor memory card 1, new Track.A is generated from AOB002 recorded by the content management apparatus 3 and AOB001 recorded by a device other than the content management apparatus 3.

Figure 8A:
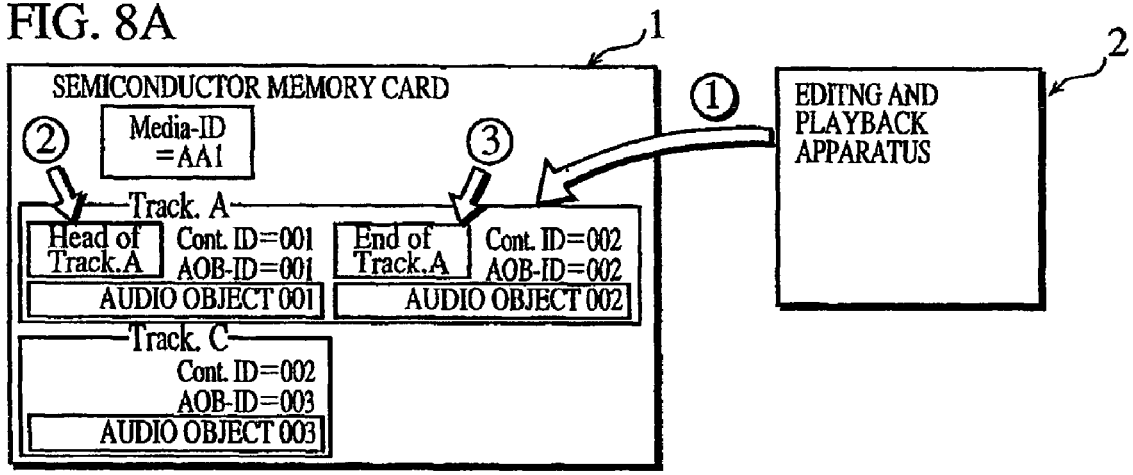
FIGS. 8A–8C show the second example of the processing by the audio data playback management system.
Figure 8B:
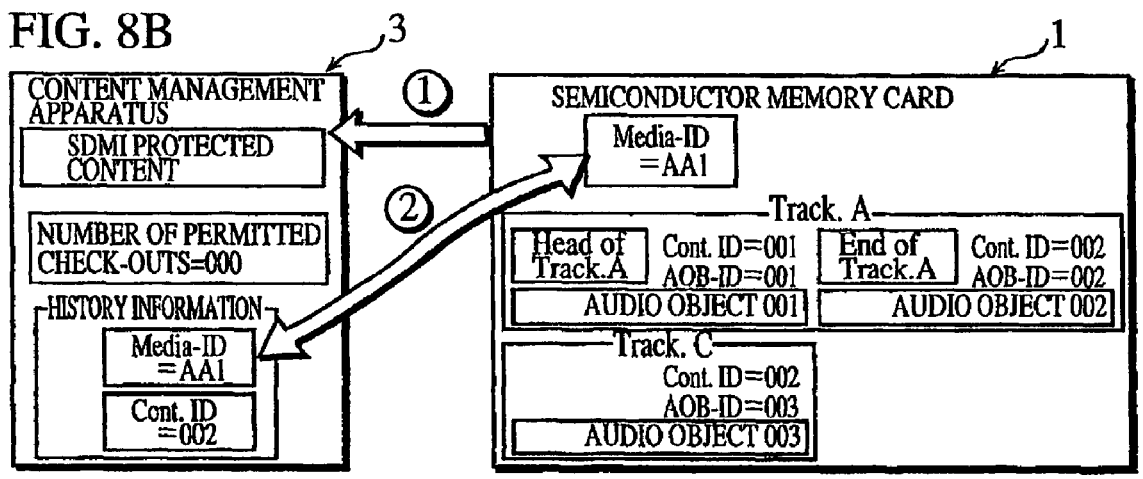
Figure 8C:
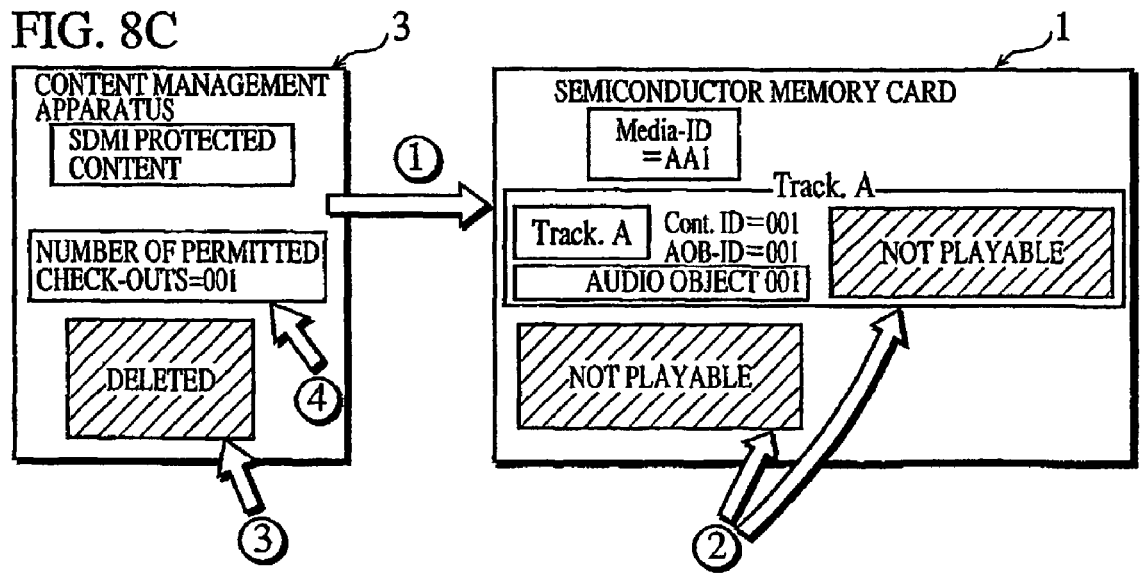

FIG. 8B shows a state where a content is checked in from the semiconductor memory card 1. Suppose that the semiconductor memory card 1 that stores two AOBs obtained by the editing operation is connected to the content management apparatus 3 again and it is requested to perform check-in on a content.

The local storage 20 of the content management apparatus 3 stores history information giving a paired Media-ID "AA1" and Content-ID "002". Therefore, as shown by the arrow ② in FIG. 8B, the check-in unit 25 detects each AOB assigned the Content-ID "002" shown by the history information by referring to the Media-ID given to the semiconductor memory card 1 and the Content-ID assigned to each AOB. Because AOB003 having the AOB-ID "003" is assigned the Content-ID "002", the content management apparatus 3 recognizes that this AOB003 is an AOB checked out by the content management apparatus 3.

Although combined with AOB001 assigned the AOB-ID "001", AOB002 whose AOB-ID is "002" is assigned a Content-ID "002". Therefore, the content management apparatus 3 recognizes that this AOB002 is also an AOB checked out by the content management apparatus 3. Because these AOBs (AOB002 and AOB003) are AOBs checked out by the content management apparatus 3, the check-in unit 25 sets AOB002 as well as AOB003 in a non-playable state (as shown by the arrow ② in FIG. 8C), deletes history information including a paired Media-ID "AA1" and Content-ID "002" (as shown by the arrow ③ in FIG. 8C), and increments the number of permitted check-outs to "001" (as shown by the arrow ④ in FIG. 8C). Especially note that in this example, although the track ID of Track.B is changed from "B" to "A", the Content-ID of Track.B remains unchanged when Track.B is combined with Track.A.

As described above, in the audio data playback management system of the first embodiment, if an AOB checked out from the local storage 20 is divided into new AOBs and the new AOBs are combined with other AOBs, the editing and playback apparatus 2 assigns the Content-ID of the original AOB to each of the new AOBs.

Even if AOBs are repeatedly divided and combined in a complicated manner, the editing-and playback apparatus 2 easily recognizes the correspondences between AOBs recorded in the semiconductor memory card and contents stored in the content management apparatus 3 merely by referring to Content-IDs. As a result, if it is requested to check in a content, the content management apparatus 3 sets every AOB assigned the Content-ID of the content in a non-playable state, thereby deleting the content from the semiconductor memory card 1. This prevents a situation where the number of permitted check-outs for an AOB is incremented even though a part of the AOB remains in the semiconductor memory card 1.

It should be noted here that in the first embodiment, the content management apparatus 3 obtains contents from an electronic music distribution system. However, the content management apparatus 3 may obtain contents by so-called CD ripping. The CD ripping is a method of obtaining contents by encoding and encrypting audio data recorded on CDs (Compact Discs). It is preferable that the number of permitted check-outs for a content obtained by the CD ripping is set as three in accordance with the SDMI Portable Device Specification described above. Also, the content management apparatus 3 may obtain contents from package media, such as DVD-Audio, other than CDs.

(Second Embodiment)

The second embodiment relates to a technique of improving the storing and processing of tracks and AOBs, each of which has a data structure conforming to an SD-Audio standard.

Figure 9:
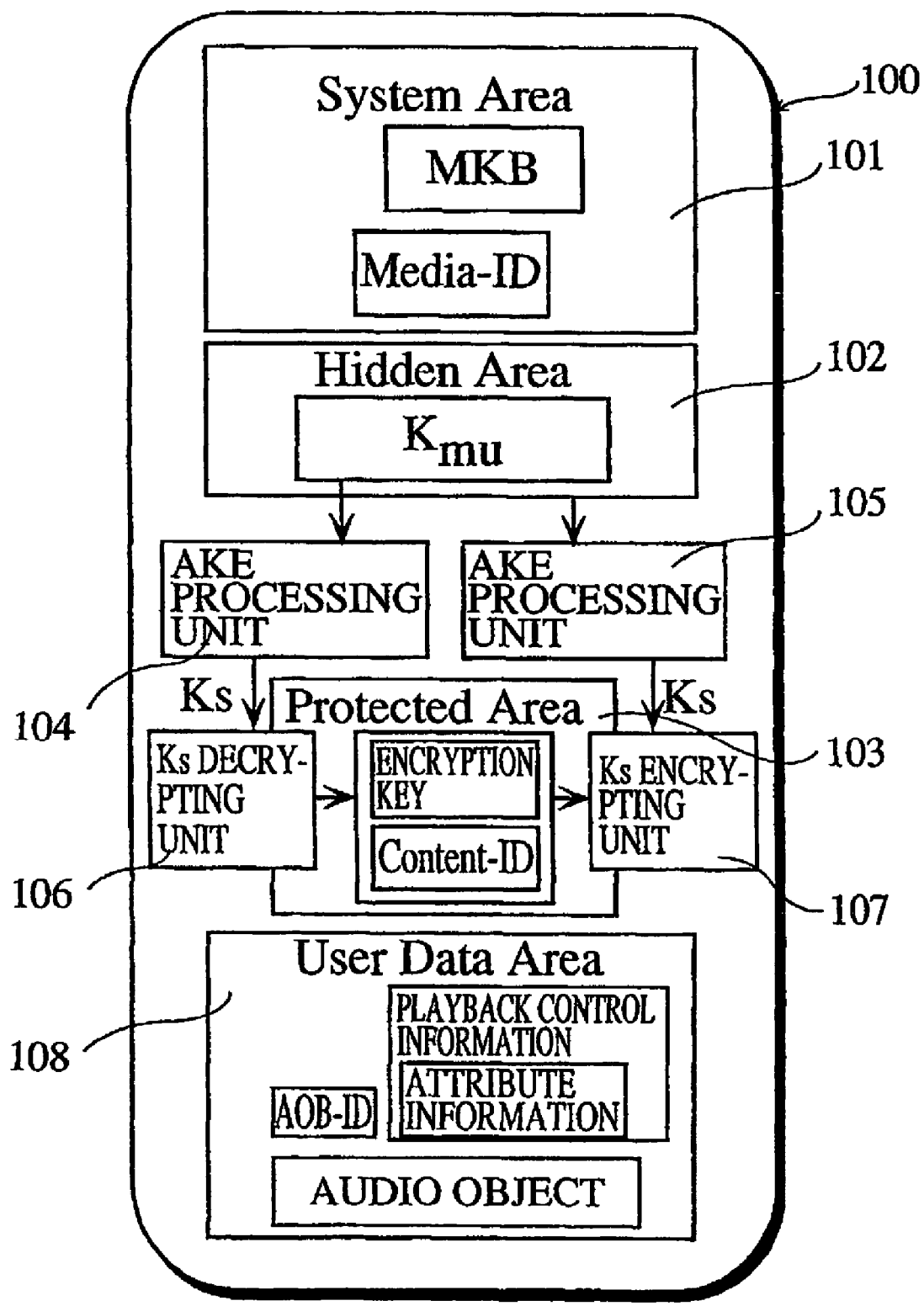
FIG. 9 shows the structure of the physical layer of an SD memory card.

The semiconductor memory card 1 of the present embodiment is an SD memory card 100 having the physical structure shown in FIG. 9.

FIG. 9 shows the structure of the physical layer of the SD memory card 100. In the drawing, the physical layer of the SD memory card 100 includes a system area 101, a hidden area 102, a protected area 103, AKE processing units 104 and 105, a Ks decrypting unit 106, a Ks encrypting unit 107, and a user data area 108.

The system area 101 is a read-only area storing a media key block (MKB) and the media ID shown in FIG. 3A. The MKB and media ID stored in this are a cannot be overwritten. Suppose that the SD memory card 100 is connected to a device (such as the editing and playback apparatus 2 or the content management apparatus 3), and the MKB and media ID are read by that device. If the connected device correctly performs a specified calculation using the MKB, the media ID, and a device key Kd held internally, it can obtain a correct encryption key Kmu.

The hidden area 102 stores the encryption key Kmu having the correct value, in other words the encryption key Kmu that should be obtained if the connected device performs correct calculation using the correct device key Kd.

The protected area 103 stores an encryption key and a content ID.

The AKE (authentication and key exchange) processing units 104 and 105 perform mutual authentication between a connected device and the SD memory card 100 using a challenge-response method, verify the authenticity of the opposing device, and if the opposing device is invalid, terminate processing. If the opposing device is valid, however, an encryption key (session key Ks) is shared by the device and the SD memory card 100. Authentication performed by the device connected to the SD memory card 100 has three phases. First, in a first challenge phase, the device generates a random number, encrypts the random number using the encryption key Kmu, and transmits the encrypted random number to the SD memory card 100 as a challenge value A. Then, in a first response phase, the SD memory card 100 uses the encryption key Kmu stored internally to decrypt the challenge value A, and transmits the decrypted value to the connected device as a response value B. Following this, in a first verify phase, the connected device decrypts the challenge value A held internally using its encryption key Kmu, and compares the decrypted value with the response value B transmitted from the SD memory card 100.

Authentication performed by the SD memory card 100 also has three phases. First, in a second challenge phase, the SD memory card 100 generates a random number, encrypts the random number using the encryption key Kmu, and transmits the encrypted random number to the connected device as a challenge value C. Then, in a second response phase, the connected device uses the encryption key Kmu stored internally to decrypt the challenge value C, and transmits the decrypted value to the SD memory card 100 as a response value D. Following this, in a second verify phase, the SD memory card 100 decrypts the challenge value C held internally using its encryption key Kmu, and compares the decrypted value with the response value D transmitted from the connected device.

If the connected device uses an improper encryption key Kmu to perform mutual authentication, challenge value A and response value B in the first verify phase and challenge value C and response value D in the second verify phase will be judged to be non-matching values, and mutual authentication will be terminated. If the authenticity of the opposing devices is verified, however, the AKE processing units 104 and 105 calculate an exclusive OR of challenge value A and challenge value C and obtain the session key Ks by decrypting the exclusive OR using the encryption key Kmu.

The Ks decrypting unit 106 uses the session key Ks to decrypt an encryption key and a content ID which have already been encrypted by session key Ks and output from the connected device. The encryption key and content ID obtained by this decryption are written into the protected area 103.

The Ks encrypting unit 107 receives a command from another device connected to the SD memory card 100 instructing it to read the encryption key and the content ID, encrypts the encryption key and the content ID stored in the protected area 103 using the session key Ks, and then outputs the encrypted encryption key and content ID to the device that issued the command.

The user data area 108 can be accessed by a connected device regardless of whether that the authenticity of that device has been verified, and stores encrypted AOB and playback control information. If the encryption key read from the protected area 103 has a correct value, the encrypted AOB stored in the user data area 108 can be correctly decrypted. Reading and writing of data from and into the protected area 103 is performed together with decryption performed by the Ks decrypting unit 106 and encryption performed by the Ks encrypting unit 107. Therefore, the protected area 103 can usually only be accessed by a connected device when that device has successfully performed AKE processing.

The following is a description of the directory structure and the file structure of the SD memory card 100.

Figure 10:
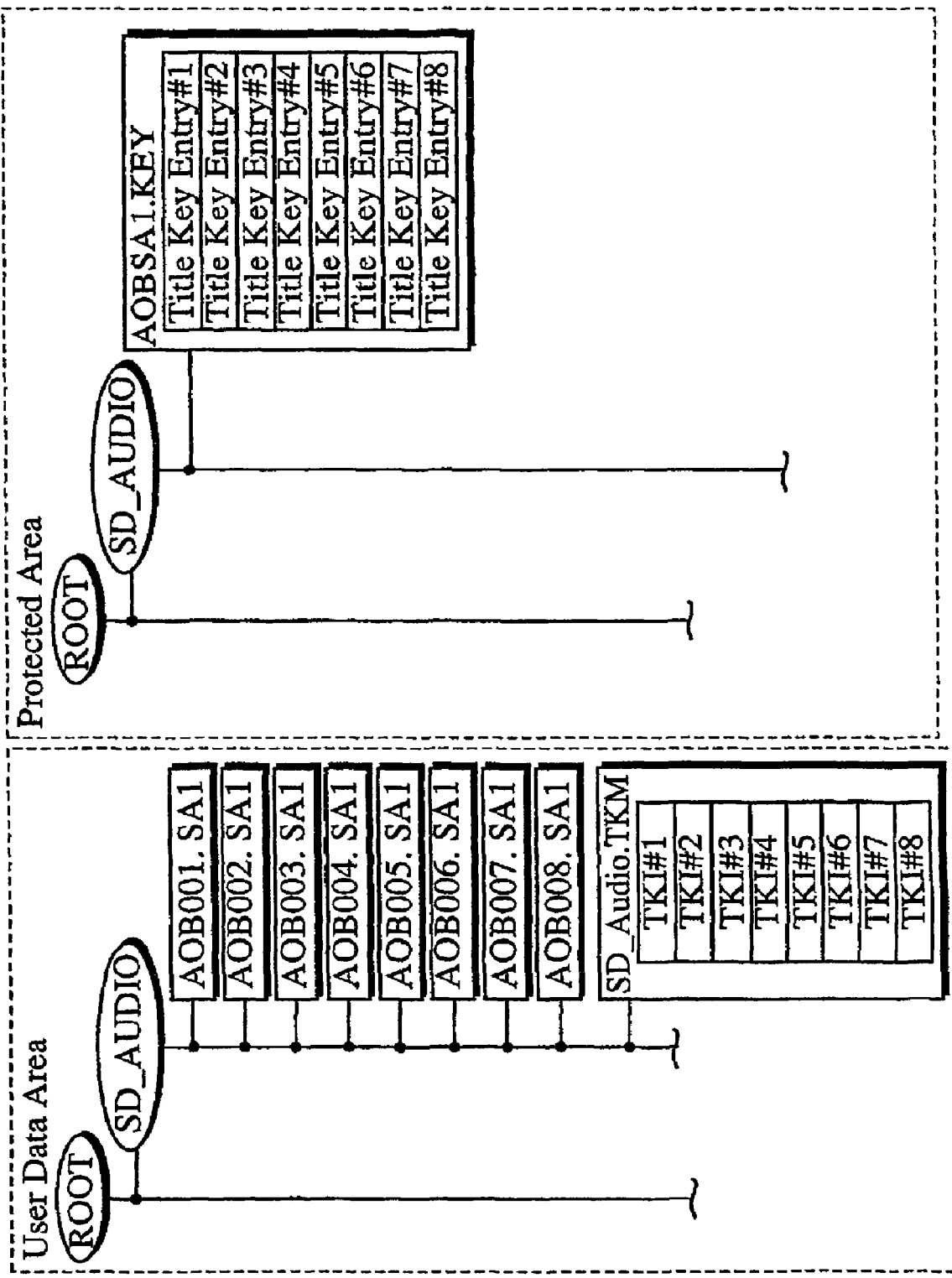
FIG. 10 shows the directory and file structures in each of a user data area and a protected area of the SD memory card.

FIG. 10 shows the directory and file structures in each of the user data area 108 and the protected area 103 of the SD memory card 100. In this drawing, each of these areas 103 and 108 includes an SD_Audio directory. The SD_Audio directory in the user data area 108 stores eight AOB files (AOB001.SA1, AOB002.SA1, AOB003.SA1, AOB004.SA1, . . . , AOB008.SA1) and SD_AUDIO.TKM. The SD_Audio directory in the protected area 103 stores a file "AOBSA1.KEY". The numbers between 001 and 008 included in the file names of the AOB files are AOB-IDs. Eight Title Key Entries included in AOBSA1.KEY and eight TKIs (track information) included in SD_AUDIO.TKM are also assigned numbers "#1, #2, #3, #4, . . . , #8" corresponding to the AOB-IDs. Each encryption key "EKey" used to encrypt one of the AOB files is stored in the Title Key Entry having a number corresponding to the AOB-ID of the AOB file. Also, each piece of playback control information used to play back one of the AOBs is stored in the TKI having a number corresponding to the AOB-ID of the AOB.

Figure 11:
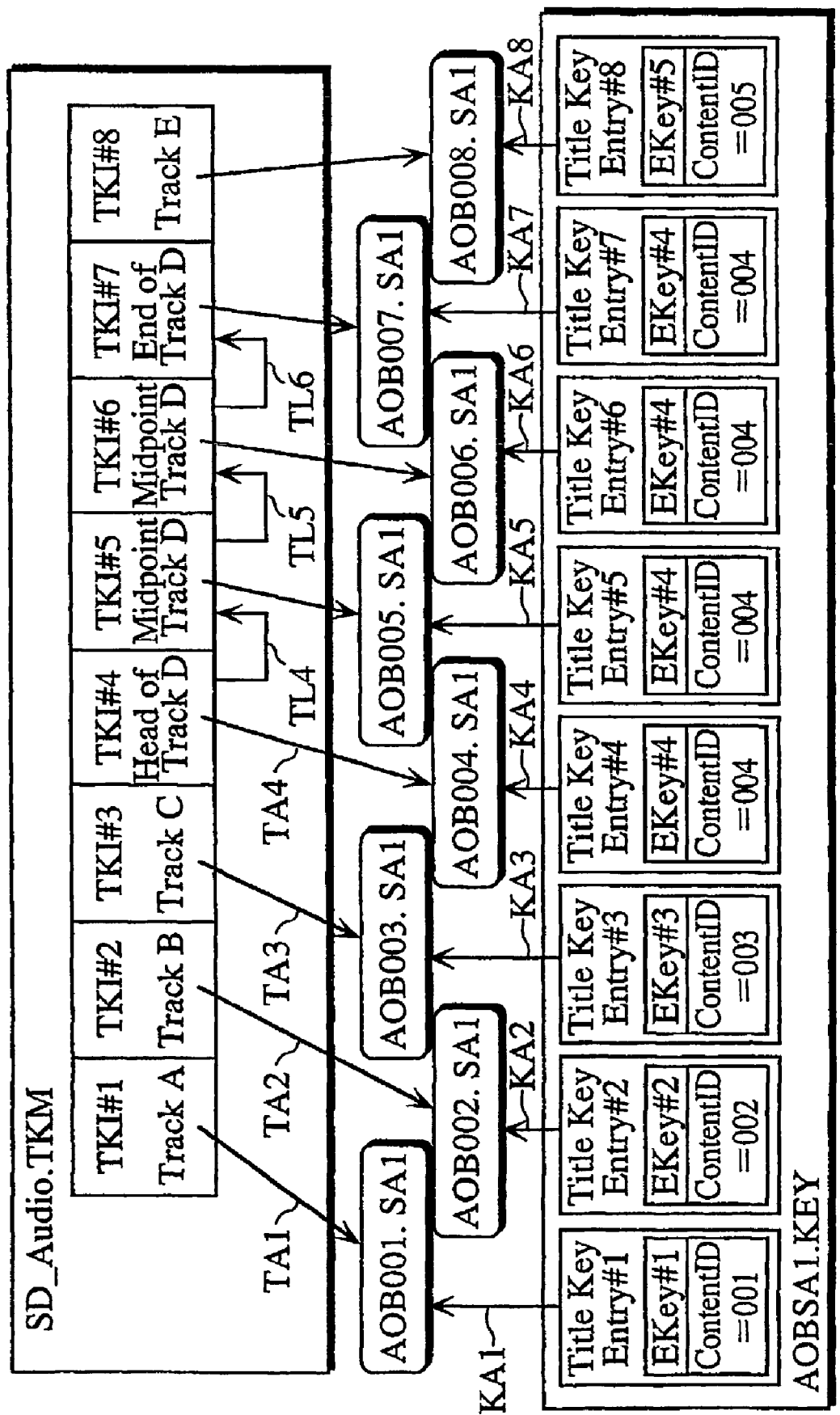
FIG. 11 shows the correspondences between TKIs, AOB files, and Title Key Entries.

FIG. 11 shows the correspondences between TKIs, AOB files, and Title Key Entries. In this drawing, the first level shows a rectangle representing the SD_AUDIO.TKM, and the second and third levels show the eight AOB files shown in FIG. 10. The first level shows eight TKIs that are each assigned one of numbers "#1, #2, #3, . . . , #8" as a TKI-ID. Each TKI corresponds to an AOB file that is assigned an AOB-ID corresponding to the TKI-ID of the TKI.

The fourth level in this drawing shows eight rectangles that represent the eight Title Key Entries containing five EKeys (EKey#1, EKey#2, EKey#3, EKey#4, and EKey#5) and five content IDs (001, 002, 003, 004, and 005). Also, each Title Key Entry is give none of numbers "#1, #2, #3, . . . , #8" specifying the Title Key Entry. Each Title Key Entry corresponds to an AOB file that is assigned an AOB-ID corresponding to the number of the Title Key Entry. Therefore, in FIG. 11, TKI#1 and Title Key Entry#1 correspond to AOB001.SA1, TKI#2 and Title Key Entry#2 correspond to AOB002.SA1, TKI#3 and Title Key Entry#3 correspond to AOB003.SA1, and TKI#4 and Title Key Entry#4 correspond to AOB004.SA1 (the arrows TA1, TA2, TA3, TA4, . . . show the correspondences between TKIs and AOB files, and the arrows KA1, KA2, KA3, KA4, . . . show the correspondences between Title Key Entries and AOB files).

Figure 12:
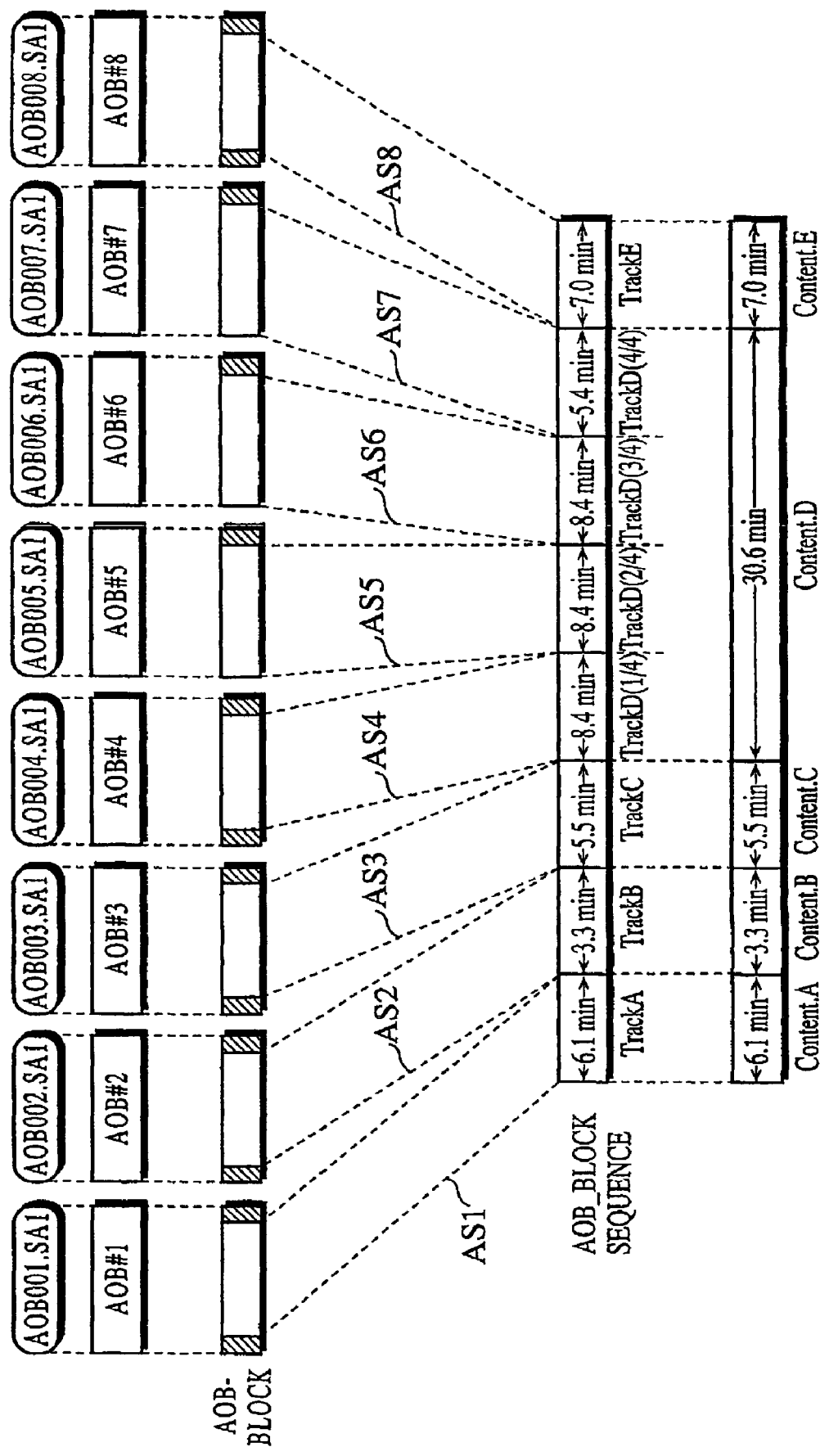
FIG. 12 shows how AOBs in the AOB files are played back during successive playback.

FIG. 12 shows how AOBs in the AOB files are played back during successive playback. In this drawing, the first level shows eight AOB files in the user data area, the second level shows each AOB contained in one of the AOB files, and the third level shows a valid part (AOB_BLOCK) of each AOB.

The fifth level shows five contents "Content.A, Content.B, Content.C, Content.D, and Content.E". The fourth level shows how each content in the fifth level is divided. In the fourth level, broken lines AS1, AS2, AS3, . . . , AS7, and AS8 indicate the correspondences between parts of contents and AOB_BLOCKs.

AOB#4 has a playback time of 8.4 minutes and is the first (or 'head') part of Content.D that has a playback time of 30.6 minutes. The AOB_BLOCKs included in AOB#5 and AOB#6 are middle parts of Content.D and also have playback times of 8.4 minutes. The AOB_BLOCK included in AOB#7 is the end part of Content.D and has a playback time of 5.4 minutes. In this way, Content.D that has a total playback time of 30.6 minutes is divided into (8.4+8.4+8.4+ 5.4-minute) parts that are each included in a different AOB. As can be seen from this drawing, the AOB included in each AOB file is subjected to a maximum playback time of 8.4 minutes.

The following is a description of the internal structure of a Title Key Entry. FIG. 13A shows the internal construction of a Title Key Entry. As shown by a broken line h1 in this drawing, a Title Key Entry includes a 7-byte EKEY (encryption key), an Availability Flag, and a Content ID.

The Availability Flag is set at 1 when a corresponding AOB exists in the SD memory card 100 and an EKey for the corresponding AOB is included in the Title Key Entry, and at 0 when the corresponding AOB exists in the SD memory card 100 but the EKey for the corresponding AOB is not included in the Title Key Entry.

The Content ID in this embodiment is used in combination with the Availability Flag in the following way. When an AOB file corresponding to the Title Key Entry exists in the SD memory card 100, the content ID in the. Title Key Entry is set at between 001 and 999. On the other hand, when the corresponding AOB file does not exist in the SD memory card 100, the content ID in the Title Key Entry is set at 0. Also, when a track corresponds to a plurality of TKIs (AOBs), the Content IDs in the Title Key Entries corresponding to the AOBs all have the same value. Meanwhile, when a track corresponds to one TKI, the Availability Flag is set at 1, and when a track corresponds to a plurality of TKIs, the Availability Flag for one of a corresponding plurality of Title Key Entries is set at 1, and other Availability Flags at 0. If the Content ID is not 0 and the Availability Flag is set at 0, a plurality of TKIs (AOBs) having the same Content ID exist, so that all Title Key Entries having the same Content ID are detected. This means that it is possible to perform a search specifying a plurality of TKIs (AOBs) corresponding to one Content ID.

TKIs are described below with reference to FIG. 13B. Referring to FIG. 13B, it can be seen that each TKI, as shown by the broken lines h2, includes Track_General_Information (TKGI), a Track_Text_Information_Data_Area (TKTXTI_DA) recording text information unique to the TKI, such as an artist name, an album name, an arranger name, and a producer name, and a Track_Time_Search_Table (TKTMSRT) in which the playback time is restricted to 8.4 minutes.

As indicated by the arrows h3 in this drawing, a TKGI includes various information items (TKI_ID, TKIN, TKI_BLK_ATR, TKI_LNK_PTR, ISRC, and BIT).

An ID with which the TKI can be uniquely identified is written in TKI_ID (in this embodiment, the ID is a 2-byte code "A4").

A TKI number in a range between 1 and 999 is written in TKIN.

An attribute for the TKI is written in TKI_BLK_ATR.

The following describes the settings of the TKI_BLK_ATR of each TKI in the example shown in FIG. 11. By referring to the TKI_BLK_ATR of each TKI, it can be seen that since the four pairs TKI#1/AOB001.SA1, TKI#2/AOB002.SA1, TKI#3/AOB003.SA1, and TKI#8/ AOB008.SA1 each correspond to separate tracks, the TKI_BLK_ATR of each of TKI#1, TKI#2, TKI#3, and TKI#8 is set as "Track". The TLK_BLK_ATR of TKI#4 is set at "Head_of_Track", the TKI_BLK_ATR of TKI#7 is set at "End_of_Track", and the TLK_BLK_ATRs of TKI#5 and TKI#6 are set at "Midpoint_of_Track". This means that the AOB file "AOB004.SA1" corresponding to TKI#4 is the start of a track, the AOB files "AOB005.SA1" and "AOB006.SA1" corresponding to TKI#5 and TKI#6 are midpoints of the track, and the AOB file "AOB007.SA1" corresponding to TKI#7 is the end of the track.

TKI_BLK_ATR can be set so that combine editing, in which any two of a plurality of tracks are combined to form a single track, and divide editing, in which one track is divided into a plurality of new tracks, can be easily performed. The following description concerns the change in TKI when two tracks are combined.

Figure 14:
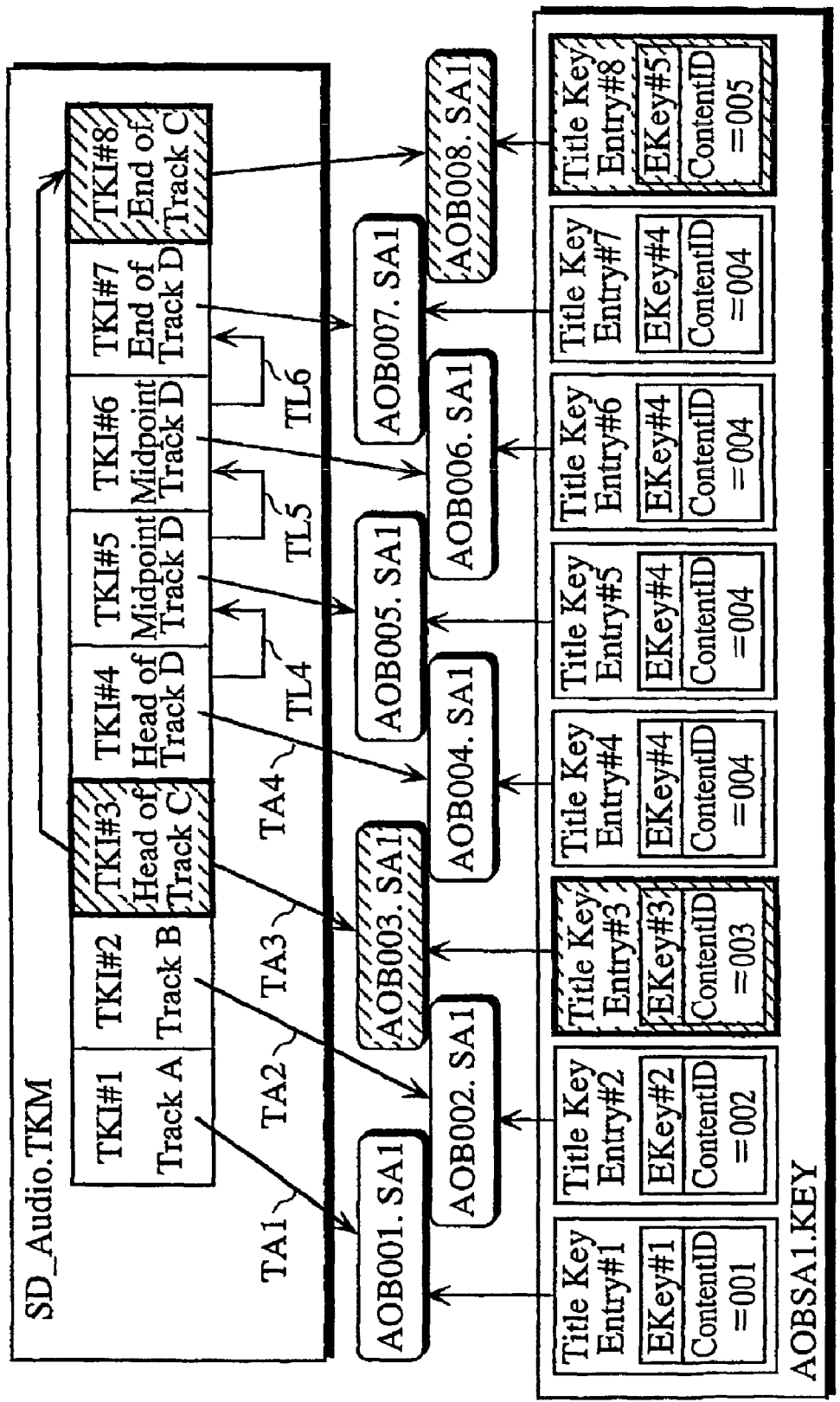
FIG. 14 shows how the TKIs are set when two tracks are combined to produce a single new track.

FIG. 14 shows how the TKIs are set when two tracks are combined to produce a single new track. The following description is based on the assumption that the user inputted an instruction to perform combine editing on Track. C and Track. E shown in FIG. 11 to generate a single new track. In this case, the AOBs that correspond to Track.C and Track.E are recorded in the AOB files AOB003.SA1 and AOB008.SA1 corresponding to TKI#3 and TKI#8, so that the TKI_BLK_ATRs of TKI#3 and TKI#8 are rewritten. FIG. 14 shows the TKI_BLK_ATRs of these TKIs after rewriting. In FIG. 11, the TKI_BLK_ATRs of TKI#3 and TKI#8 are respectively written as "Track.C" and "Track.E". However, in FIG. 14, the TKI_BLK_ATR of TKI#3 is rewritten as "Head_of_Track C" and the TKI_BLK_ATR of TKI#8 is rewritten as "End_of_Track C". By rewriting the TKI_BLK_ATRs in this way, TKI#3, TKI#8, AOB003.SA1, AOB008.SA1, Title Key Entry#3, and Title Key Entry#8 end up being treated as parts of a single new track "Track.C". During this operation, Title Key Entry#3 and Title Key Entry#8 corresponding to AOB003 and AOB008 are respectively given the original content IDs "003" and "005" and the original encryption keys "EKey#3" and "EKey#5".

Figure 15:
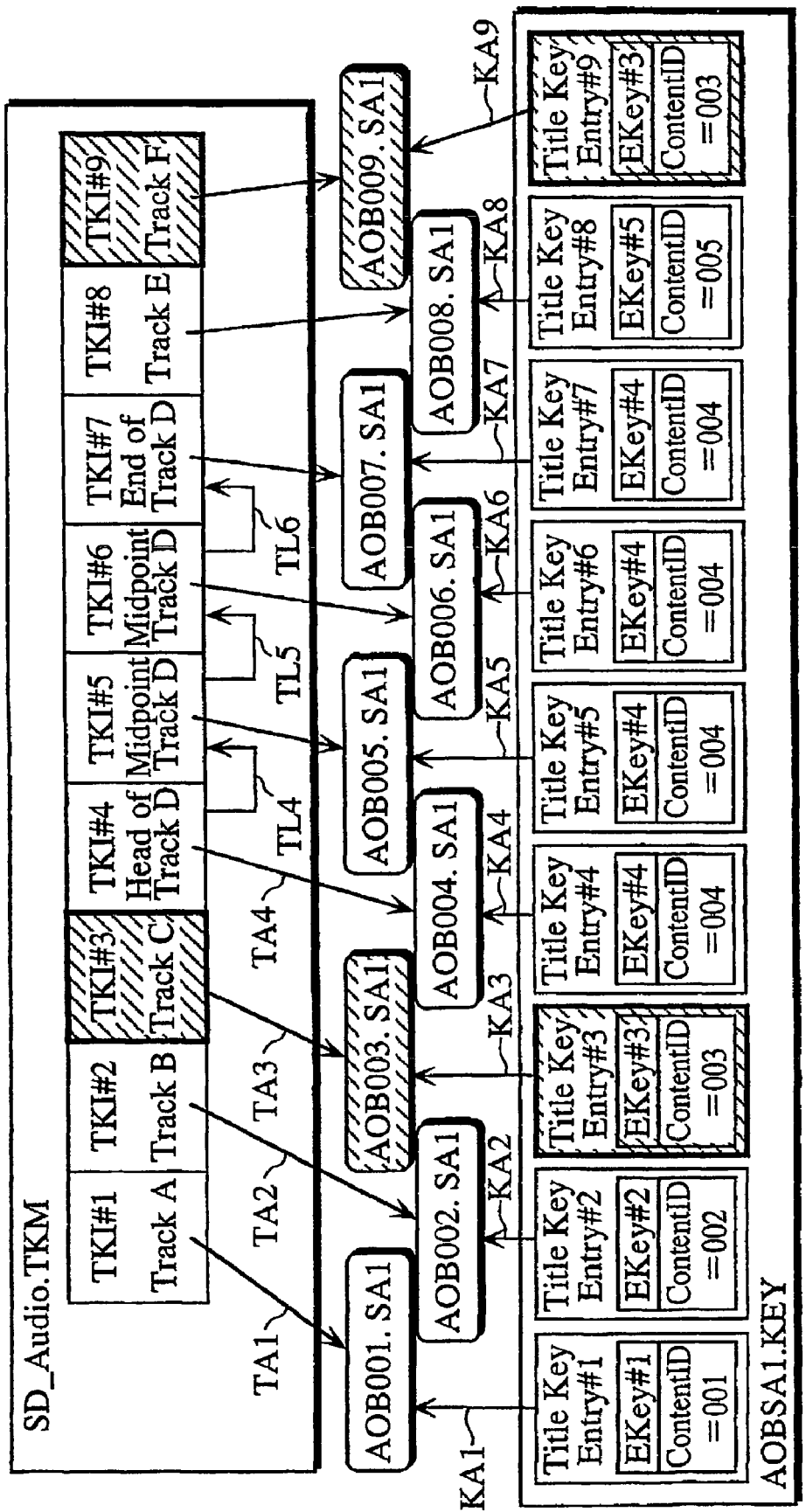
FIG. 15 show an example in which a track is divided into two new tracks.

The following is a description of the change in TKI when a track is divided. FIG. 15 show an example in which a track is divided into two new tracks. In this example, it is assumed that the user inputted an instruction to perform divide editing on Track.C shown in FIG. 11 to generate two tracks "Track.C" and "Track.F". When Track.C is divided into Track.C and Track.F, AOB#3 forming Track.C is divided into new AOBs. A number "009" is assigned to one of the new AOBs (a new AOB009 is obtained) because numbers between 001 and 008 have already been assigned to AOBs, and TKI#9 and Title Key Entry#9 are generated for AOB009.SA1. This results in the situation shown in FIG. 15. Title Key Entry#9 includes the content ID "003" assigned to AOB003 and EKey#3 used to encrypt AOB003.

TKI_LNK_PTR contains TKIN for a link target TKI. As shown by arrows TL4, TL5, and TL6 in FIG. 11, the TKI_LNK_PTR for each of TKI#4, TKI#5, TKI#6, and TKI#7 corresponding to the four AOB files forming Track D are set so as to indicate the next TKI.

ISRC contains the ISRC (International Standard Recording Code) in the TKGI.

BIT (block information table) shows which part of a corresponding AOB is valid (AOB_BLOCK).

Figure 16:
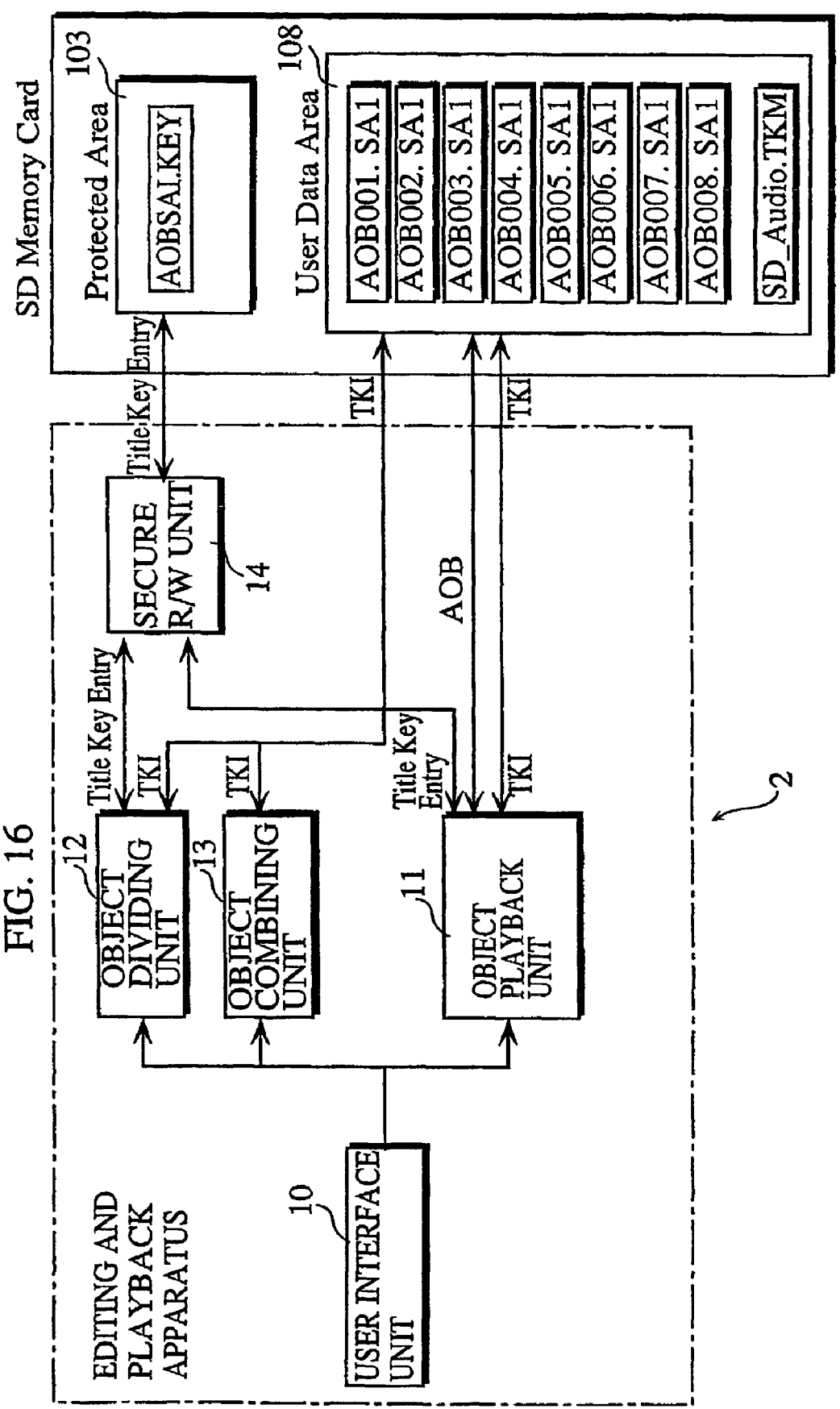
FIG. 16 shows the internal construction of an editing and playback apparatus of the second embodiment.
Figure 17:
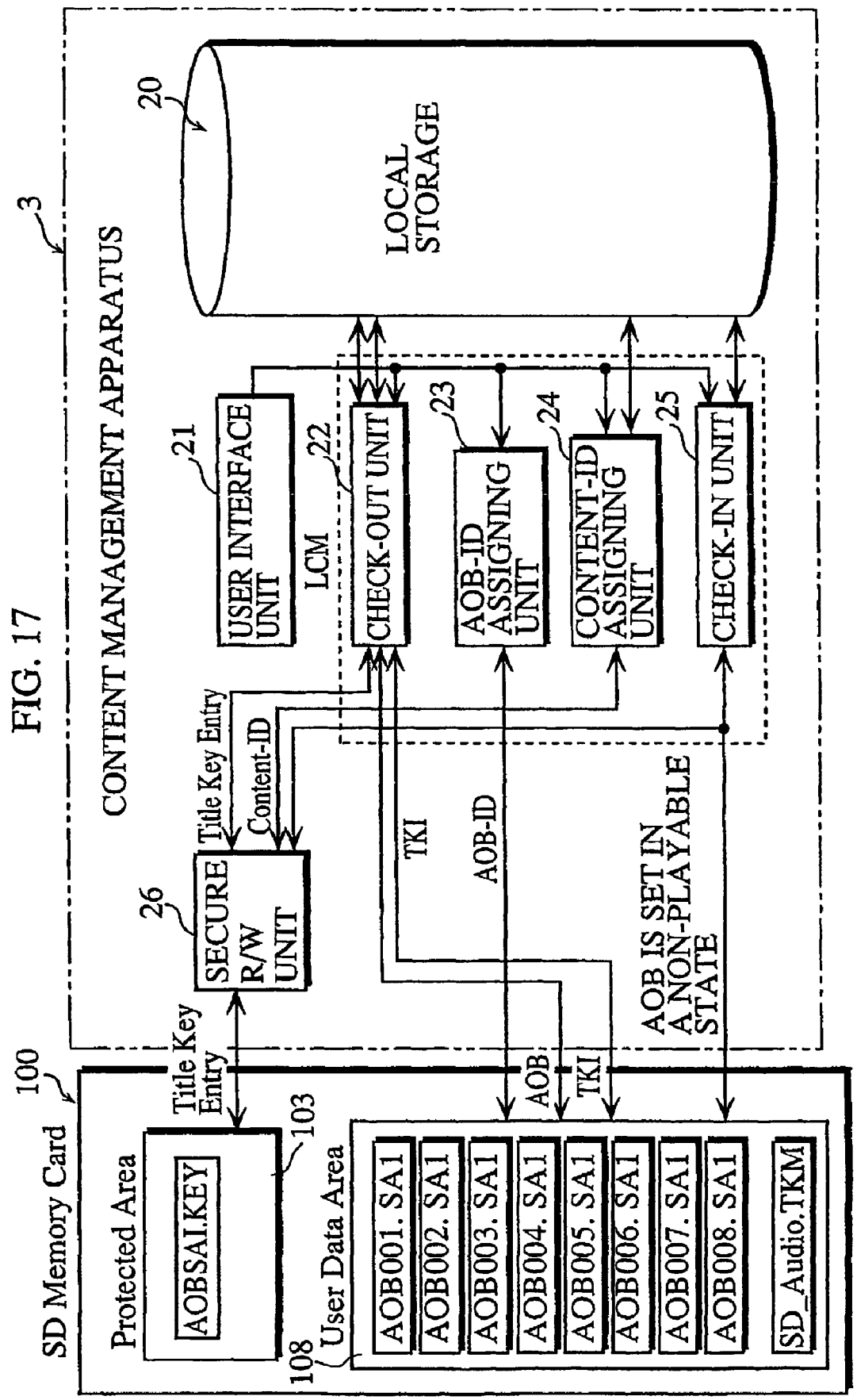
FIG. 17 shows the internal construction of a content management apparatus of the second embodiment.
Figure 18:
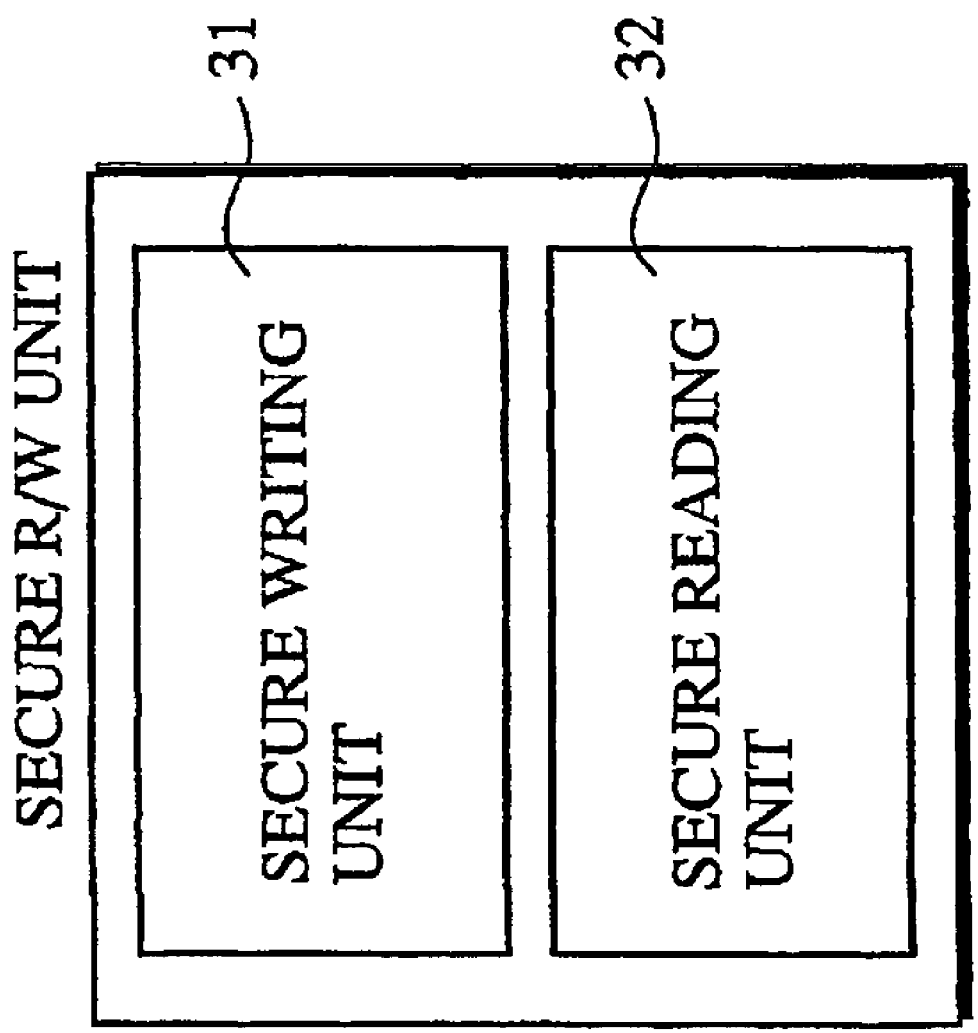
FIG. 18 shows the internal construction of a secure R/W unit.

The following description concerns the constructions of the editing and playback apparatus 2 and the content management apparatus 3 of the second embodiment. The constructions of the editing and playback apparatus 2 and the content management apparatus 3 of this embodiment are shown in FIGS. 16 and 17, respectively. These apparatuses 2 and 3 of the present embodiment differ from those of the first embodiment (see FIGS. 3B and 4) in that the present editing and playback apparatus 2 further includes a secure R/W unit 14 and the content management apparatus 3 further includes a secure R/W unit 26. When the editing and playback apparatus 2 is connected to the SD memory card 100, the secure R/W unit 14 performs AKE processing with the SD memory card 100 using the MKB and media ID and encrypts and decrypts data using a session key Ks. Also, when the content management apparatus 3 is connected to the SD memory card 100, the secure R/W unit 26 performs AKE processing with the SD memory card 100 using the MKB and media ID and encrypts and decrypts data using a session key Ks. Therefore, the object dividing unit 12 and the object playback unit 11 of the present editing and playback apparatus 2 read and write each Title Key Entry from and into the SD memory card 100 via the secure R/W unit 14. Similarly, the check-out unit 22 and the content ID assigning unit 24 of the present content management apparatus 3 read and write each Title Key Entry from and into the SD memory card 100 via the secure R/W unit 26. FIG. 18 shows the internal construction of each of the secure R/W units 14 and 26. As shown in this drawing, each of the secure R/W units 14 and 26 includes a secure writing unit 31 and a secure reading unit 32. The secure writing unit 31 has a construction shown in FIG. 19.

Figure 19:
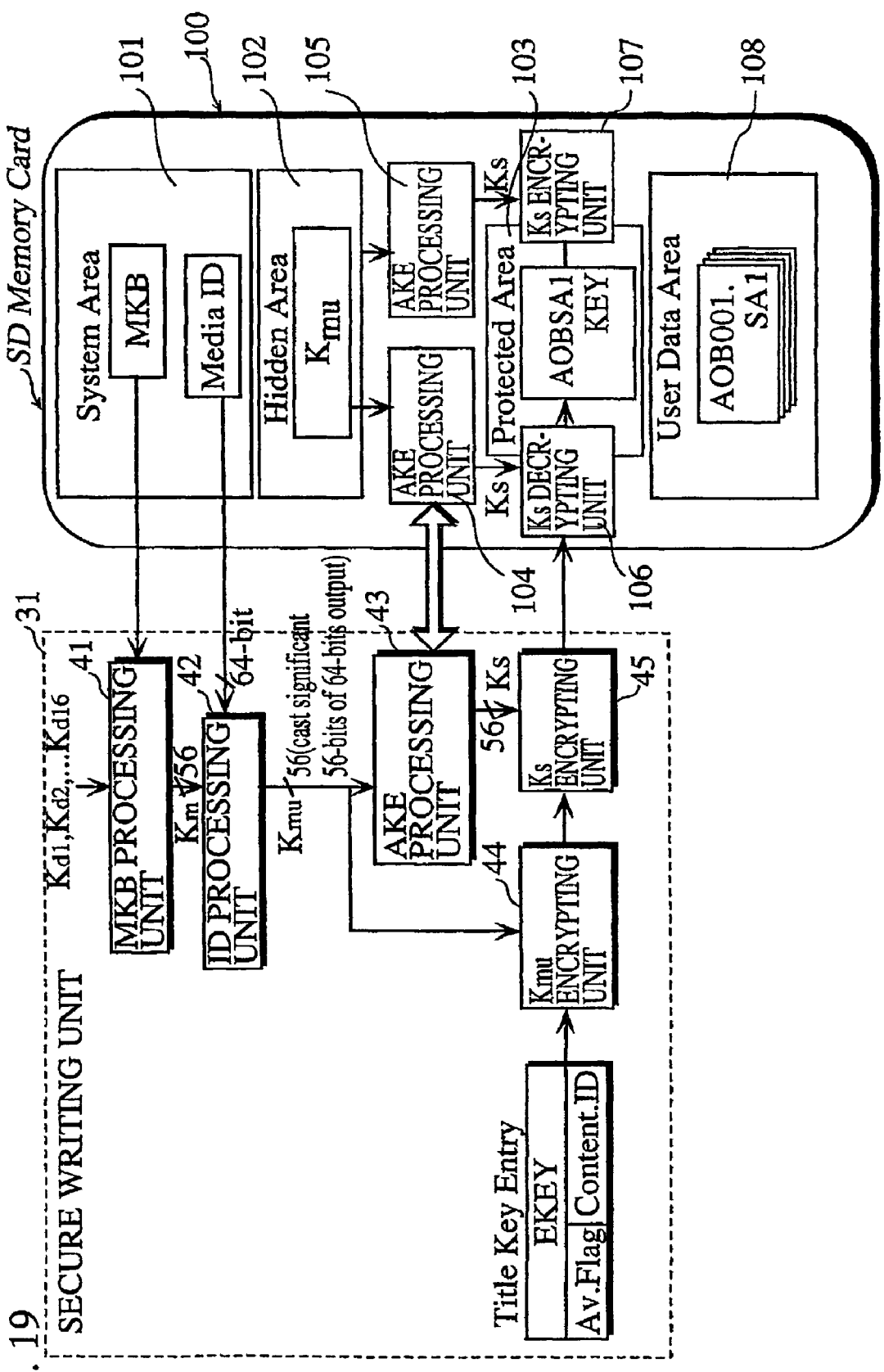
FIG. 19 shows the internal construction of a secure writing unit.

As shown in FIG. 19, the secure writing unit 31 includes an MKB processing unit 41, an ID processing unit 42, an AKE processing unit 43, a Kmu encrypting unit 44, and a Ks encrypting unit 45.

The MKB processing unit 41 reads an MKB stored in the system area of the SD memory card 100 and a device key Kd assigned by the manufacturer of the editing and playback apparatus 2 and the content management apparatus 3, and obtains a 56-bit encryption key Km by performing a specific calculation using the MKB and the device key Kd, then outputs the encryption key Km to the ID processing unit 42.

On receiving the encryption key Km from the MKB processing unit 41, the ID processing unit 42 reads the Media-ID from the system area of the SD memory card 100, and performs a specific calculation to obtain a 64-bit calculation result, the lower 56 bits of which are output to the AKE processing unit 43 and the Kmu encrypting unit 44 as the encryption key KMU.

The AKE processing unit 43 performs AKE processing using the encryption key Kmu calculated by the ID processing unit 42 and the encryption key Kmu in the SD memory card 100. The AKE processing unit 43 then outputs a 56-bit session key Ks resulting from this calculation to the Ks encrypting unit 45.

The Kmu encrypting unit 44 encrypts a Title Key Entry, which should be recorded in the SD memory card 100, using the encryption key Kmu output from the ID processing unit 42 and outputs it to the Ks encrypting unit 45.

The Ks encrypting unit 45 encrypts the Title Key Entry, which has already been encrypted by the Kmu encrypting unit 44, using the 56-bit session key Ks output from the AKE processing unit 43. The Title Key Entry processed in this manner is sent to the SD memory card 100 and is written in the protected area 103.

Figure 20:
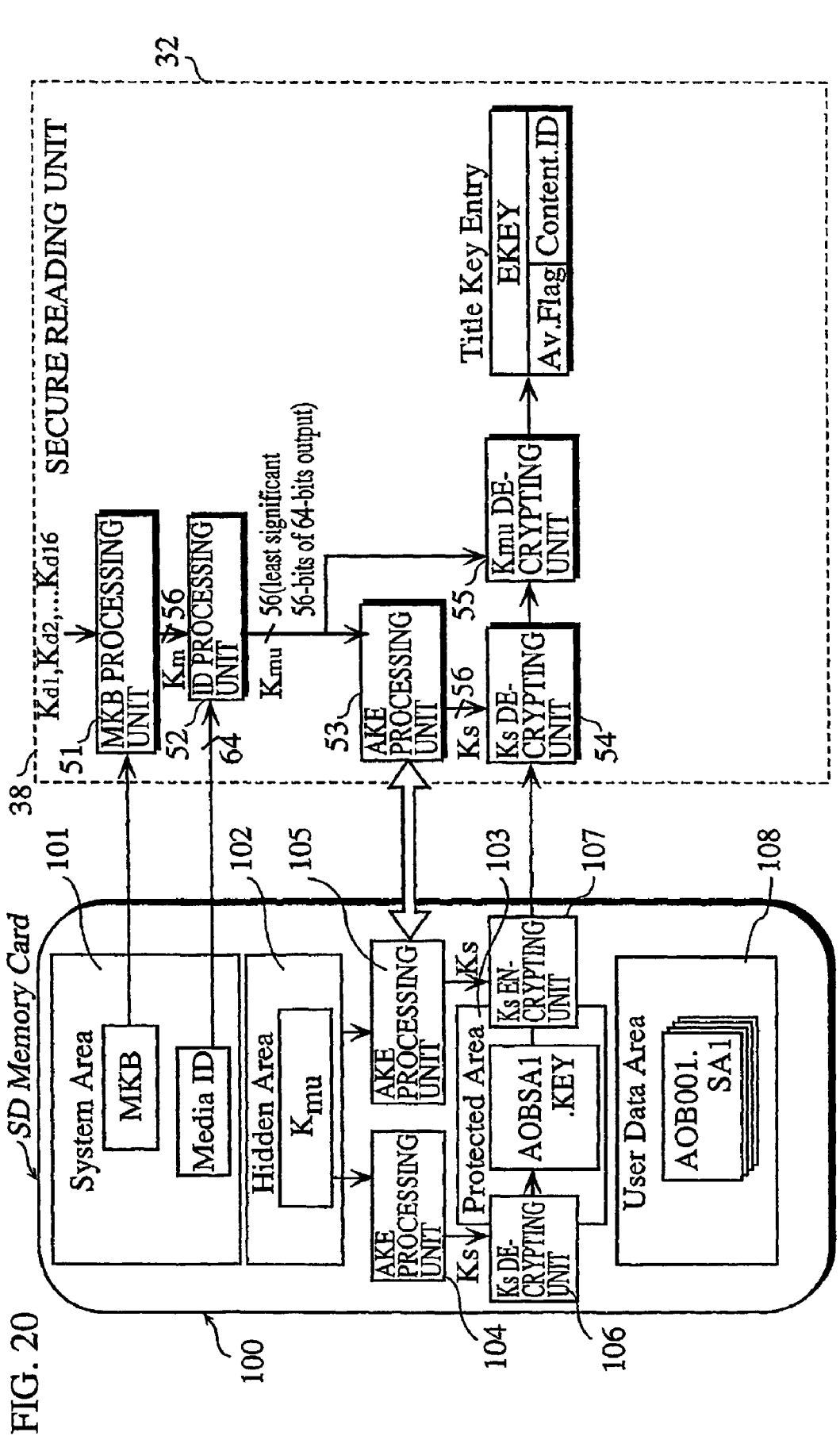
FIG. 20 shows the internal construction of a secure reading unit.

The internal construction of the secure reading unit 32, as shown in FIG. 20, includes an MKB processing unit 51, an ID processing unit 52, an AKE processing unit 53, a Ks decrypting unit 54, and a Kmu decrypting unit 55.

After the SD memory card 100 is connected to the editing and playback apparatus 2 or the content management apparatus 3, the MKB processing unit 51 reads an MKB from the system area 101, and performs a specific calculation on the read MKB using a device key Kd, thereby obtaining a 56-byte encryption key Km.

The ID processing unit 52 reads a Media-ID from the system area 101 of the connected SD memory card 100 and performs a specific calculation using the encryption key Km calculated by the MKB processing unit 51 and the read Media-ID to obtain a 64-bit calculation result, the lower 56 bits of which are output to the AKE processing unit 53 and the Kmu decrypting unit 55 as the encryption key Kmu.

The AKE processing unit 53 performs AKE processing with the AKE processing unit 105 of the SD memory card 100 using the encryption key Kmu output from the ID processing unit 52, and outputs the 56-bit calculation result to the Ks decrypting unit 54 as a session key Ks.

The Ks decrypting unit 54 reads an encrypted Title Key Entry stored in the protected area 103 and decrypts the read Title Key Entry using the 56-bit session key Ks output from the AKE processing unit 53. Then the Ks decrypting unit 54 outputs the decryption result to the Kmu decrypting unit 55.

The Kmu decrypting unit 55 performs decrypting using the 56-bit encryption key Kmu calculated by the ID processing unit 52, thereby obtaining a Title Key Entry.

As described above, a device attempting to access the protected area 103 of the SD memory card 100 needs to perform encryption, decryption, and AKE processing using the session key Ks and the encryption key Kmu before accessing the protected area 103. This prevents the access from an unauthorized device to the protected area 103. Therefore, only an authorized device, such as the editing and playback apparatus 2 and the content management apparatus 3, can properly read and write data from and into the protected area 103.

The directory structure and the file structure of the local storage 20 are described below. FIG. 21A shows the directory and file structures of the local storage 20. As shown in this drawing, the local storage 20 includes a user area that is accessible even by an ordinary application program, and a secure area that is accessible only by a licensed compliant module and is not accessible by other application programs. Under the root directory in the user area, there is a download directory for storing downloaded contents. This download directory stores each content downloaded by the content management apparatus 3 via the EMD. In FIG. 21A, the download directory stores five files (Content.A.pcj, Content.B.pcj, Content.C.pcj, Content.D.pcj, and Content.E.pcj). Each of these files includes an encrypted content and right management information concerning the content. As described in the first embodiment, the right management information shows the number of permitted check-outs and an encryption key for the content.

The user area stores a distribution package management table. FIG. 21B shows an example of the distribution package management table. As shown in this drawing, the distribution package management table includes an index number assigned to each distribution package, a file path showing the location of a file storing the distribution package, and content introduction information showing the artist name and title of a content corresponding to the distribution package. A user can know the directory and file name of each content by referring to the distribution package management table.

The secure area of the local storage 20 is described below. The secure area is an area for storing information, such as fee information, that must not be manipulated by the user, and stores history information table that is composed of a plurality pieces of history information, each of which corresponds to one content. FIG. 21D shows an example of the history information table concerning Content.A–Content.E, whose numbers of permitted check-outs are set as shown in FIG. 21C. In FIG. 21C, each of the numbers of permitted check-outs A and B that respectively relate to Content.A and Content.B is set at two, so that check-out can be performed twice on each of Content.A and Content.B. Therefore, each of history information A concerning Content.A and history information B concerning Content.B includes two paired Media-ID and Content-ID. Also, in FIG. 21C, each of the numbers of permitted check-outs C–E that respectively relate to Content. C–Content.E is set at one, so that check-out can be performed once on each of Content.C–Content.E. Therefore, each of history information C-history information E that respectively relate to Content.C–Content.E includes one paired Media-ID and Content-ID.

Figure 22:
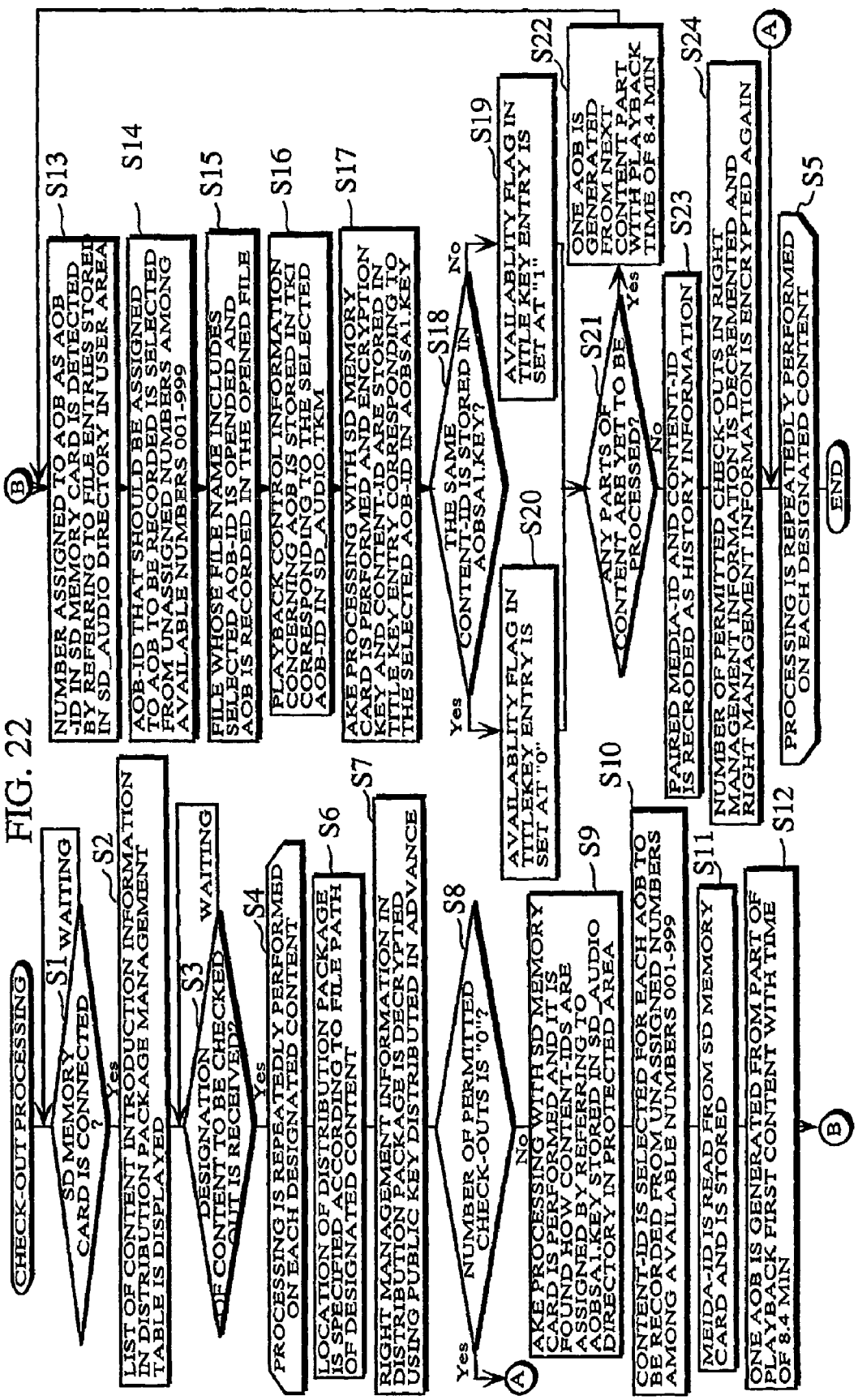
FIG. 22 is a flowchart showing a check-out operation in the second embodiment.

FIG. 22 is a flowchart showing the processing by the user interface unit 21, the check-out unit 22, the AOB-ID assigning unit 23, and the Content-ID assigning unit 24 during check-out from the local storage 20, which has the directory and file structures described above, to the SD memory card 100. Check-out and check-in in the second embodiment are described below with reference to the flowchart shown in FIG. 22.

The user interface unit 21 waits for the content management apparatus 3 to be connected to the SD memory card 100 in step S1. The user interface unit 21 displays a list of the content introduction information in the distribution package management table in step S2. As described above, the content introduction information includes the title name and artist name of each content. Therefore, the user can recognize what contents are stored in the download directory by referring to the list of the content introduction information. The user interface unit 21 then receives the designation of each content, out of the contents in the download directory, that should be checked out in step S3. After the designation is received, the process proceeds to a loop processing of steps S4 to S5 to process the first of the designated contents. In the loop processing, the operations in steps S6–S24 are repeatedly performed for each content designated in step S3. In step S6, the check-out unit 22 finds the file path of the first content and specifies the location of a corresponding distribution package by referring to the distribution package management table. In step S7, the check-out unit 22 decrypts the right management information in the distribution package using a public key distributed in advance. Because the right management information includes the number of permitted check-outs and the encryption key for the first content, the check-out unit 22 can know how many times the first content can be further checked out by referring to the decrypted right management information. In step S8, the check-out unit 22 judges whether the number of permitted check-outs is zero or at least one. If the number of permitted check-outs is zero, the first content cannot be further checked out, so that steps S9–S24 are skipped and the next content is processed. If the number of permitted check-outs is at least one, the process proceeds from step S8 to step S9.

In step S9, after AKE processing with the SD memory card 100 is performed, the Content-ID assigning unit 24 refers to AOBSA1. KEY stored in the SD_Audio directory in the protected area 103. The file AOBSA1.KEY contains a Title Key Entry for each AOB recorded in the SD memory card 100 and each Title Key Entry includes a Content-ID, so that it can be found how Content-IDs are assigned in the SD memory card 100 by referring to AOBSA1.KEY.

In step S10, the Content-ID assigning unit 24 selects a Content-ID for each AOB to be recorded from unassigned numbers among available numbers 001–999. In step Sl, the check-out unit 22 reads the Media-ID from the SD memory card 100 and holds the read Media-ID. The content management apparatus 3 obtains the Content-ID and the Media- ID in this manner. Following this, the content management apparatus 3 records each AOB.

In step S12, the check-out unit 22 sets the head part, which has a playback time of no more than 8.4 minutes, of the currently processed content as one AOB. As described above, each AOB is set to have a playback time of no more than 8.4 minutes for the purpose of suppressing the size of the playback control information including a time map table. In step S13, the AOB-ID assigning unit 23 refers to file entries in the SD_Audio directory in the user area. The reason for this is as follows. The file names of AOB files include corresponding AOB-IDs and are listed as file entries in the SD_Audio directory.

This construction makes it possible to find which AOB-IDs have already been assigned to AOBs in the SD memory card 100 merely by referring to the file entries. Therefore, to find AOB-IDs that have already been assigned, the AOB-ID assigning unit 23 refers to the file entries. In step S14, the AOB-ID assigning unit 23 selects an AOB-ID for each AOB to be recorded from unassigned numbers among available numbers 001–999. In step S15, the check-out unit 22 opens an AOB file whose file name includes the selected AOB-ID and records the AOB in the opened AOB file. Then, in step S16, the check-out unit 22 specifies a TKI, out of a plurality of TKIs in SD_AUDIO.TKM, that corresponds to the selected AOB-ID, and stores playback control information for the AOB in the specified TKI.

In step S17, after AKE processing with the SD memory card 100 is performed, the check-out unit 22 stores the encryption key and the Content-ID selected in step S10 in a Title Key Entry, out of Title Key Entries in AOBSA1.KEY, that corresponds to the selected AOB-ID. In step S18, the check-out unit 22 judges whether the same Content-ID has already been stored in AOBSA1.KEY. If the judgement result is negative, the process proceeds to step S19 where the check-out unit 22 sets the Availability Flag in the corresponding Title Key Entry at "1". On the other hand, if the judgement result is positive, the process proceeds to step S20 where the check-out unit 22 sets the Availability Flag in the corresponding Title Key Entry at "0".

In this manner, if an AOB corresponds to a content and is recorded in the SD_Audio directory, or if the first of a plurality of AOBs corresponding to a content is recorded in the SD_Audio directory, the Availability Flag in a Title Key Entry corresponding to the recorded AOB is set at "1". If a plurality of AOBs correspond to a content and AOBs other than the first AOB are recorded in the SD_Audio directory, the Availability Flag in each corresponding Title Key Entry is set at "0".

After the Availability Flag setting is completed, the process proceeds to step S21 where it is judged whether any parts of the content currently processed are yet to be processed. If the content has a playback time of no more than 8.4 minutes, no part of the content is yet to be processed and the judgement result in step S21 becomes "No", so that the process proceeds to step S23. If the playback time of the content exceeds 8.4 minutes, any parts of the content are yet to be processed and the judgement result in step S21 becomes "Yes", so that the process proceeds to step S22. In step S22, the check-out unit 22 generates an AOB from the next part, which has a playback time of no more than 8.4 minutes, of the content and the process proceeds to step S13. The AOB generated in step S22 is assigned a new AOB-ID (steps S13 and S14) and is stored in a file whose file name includes the new AOB-ID (step S15). By repeating the operations in steps S9–S20 until the judgement result in step S21 becomes "Yes", a content with a long playback time (such as 20 or 30 minutes) is recorded in the SD_Audio directory as a plurality of AOBs (such as three or four AOBs).

After every AOB corresponding to the content currently processed is recorded in the SD_Audio directory, the process proceeds to step S23 where the AOB-ID assigning unit 23 records a paired Media-ID and Content-ID as history information. Following this, in step S24, the number of permitted check-outs in the right management information is decremented and the right management information is encrypted again. In this manner, every AOB corresponding to the currently processed content is recorded in the SD memory card 100 and the check-out processing is completed.

Figure 23:
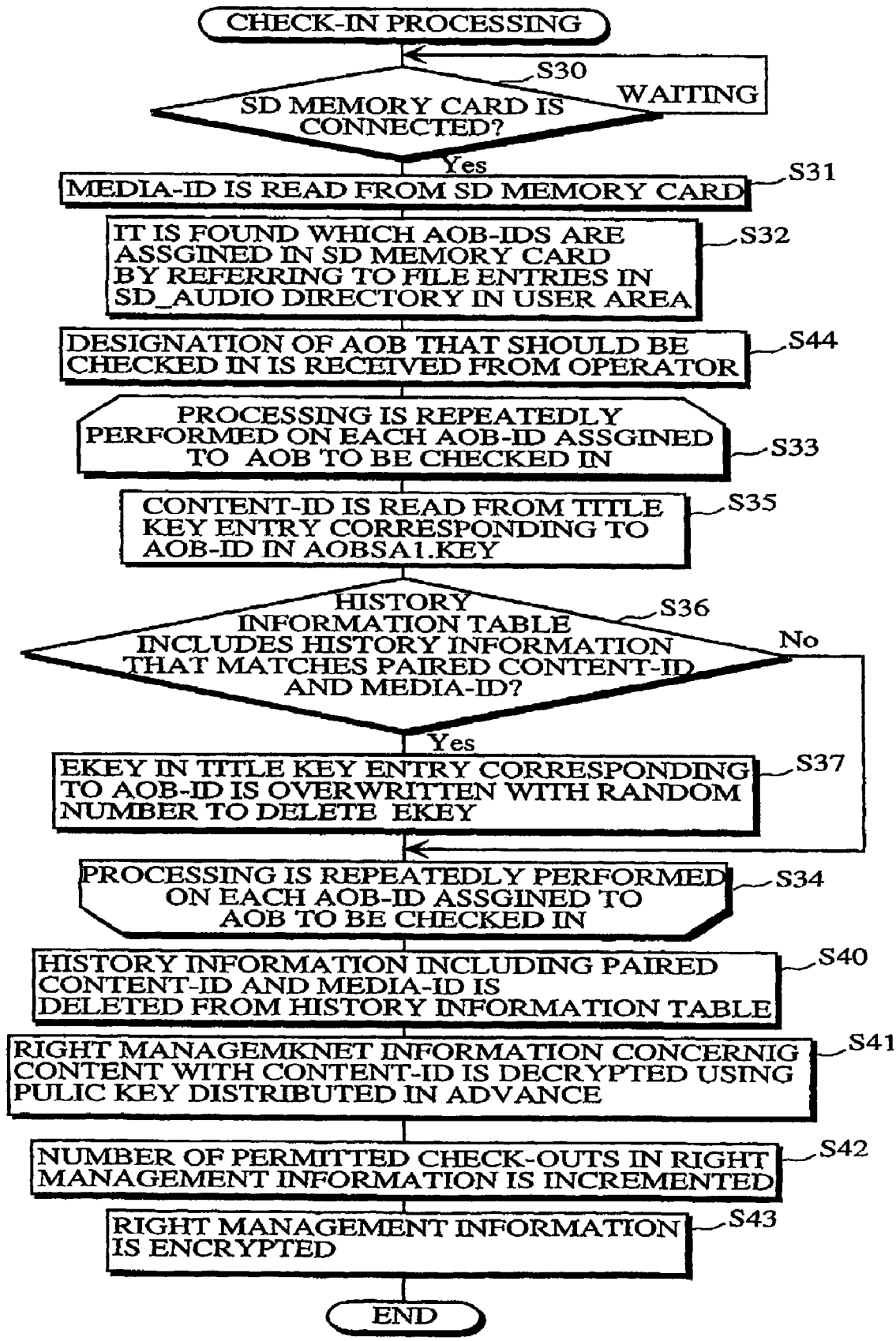
FIG. 23 is a flowchart showing a check-in operation in the second embodiment.

The following is a description of check-in processing. FIG. 23 is a flowchart showing the operations of the user interface unit 21 and the check-in unit 25 during check-in from the SD memory card 100 having the directory and file structures described above. Check-in processing in the second embodiment is described below with reference to the flowchart shown in FIG. 23.

In step S30, the check-in unit 25 waits for the content management apparatus 3 to be connected to the SD memory card 100. After the content management apparatus 3 is connected to the SD memory card 100, the check-in unit 25 reads the Media-ID from the SD memory card 100 in step S31. In step S32, the check-in unit 25 finds which AOB-IDs have already been assigned in the SD memory card 100 by referring to the file entries in the SD_Audio directory in the user area. After AOB-IDs that have already been assigned are found in step S32, the process proceeds to step S44 where designation of each AOB that should be checked in is received from the operator. Following this, the process proceeds to the loop processing of steps S33 to S34. In the loop processing, the operations in steps S35–S37 are repeatedly performed for each AOB-ID assigned to an AOB that should be checked in. In this embodiment, the loop processing of steps S33 to S34 is repeatedly performed for each designated AOB-ID, out of AB-IDs assigned in the SD memory card 100. However, the present invention is not limited to this. For instance, a user may designate each track to be checked in and check-in may be performed only on each AOB having a Content-ID that is the same as that of the designated track. In step S35, the check-in unit 25 reads a Content-ID in a Title Key Entry corresponding to one of the designated AOB-IDs from AOBSA1.KEY.

In step S36, the check-in unit 25 judges whether the history information table includes history information that shows a pair of the Media-ID and the read Content-ID. If the judgement result is affirmative, an AOB corresponding to the history information is an AOB that the content management apparatus 3 previously checked out to the SD memory card 100. Therefore, the process proceeds to step S37 where the check-in unit 25 deletes the Title Key in the corresponding Title Key Entry by overwriting the Title Key with a random number. As a result, the corresponding AOB is set in a non-playable state. The processing described above is repeatedly performed on each AOB-ID designated in step S44. By repeatedly performing the operations in steps S35–37, each AOB that the content management apparatus 3 previously checked out is set in a non-playable state. In step S40, the history information showing each pair of the Media-ID and a Content-ID read in step S35 is deleted from the history information table. In step S41, right management information having the Content-ID assigned to the content checked in to the local storage 20 is decrypted using a public key distributed in advance. Then, the number of permitted check-outs included in the right management information is incremented in step S42 and the right management information is encrypted again in step S43. As a result, the right management information returns to a state before check-out, and it becomes possible to check out the content again.

Figure 24:
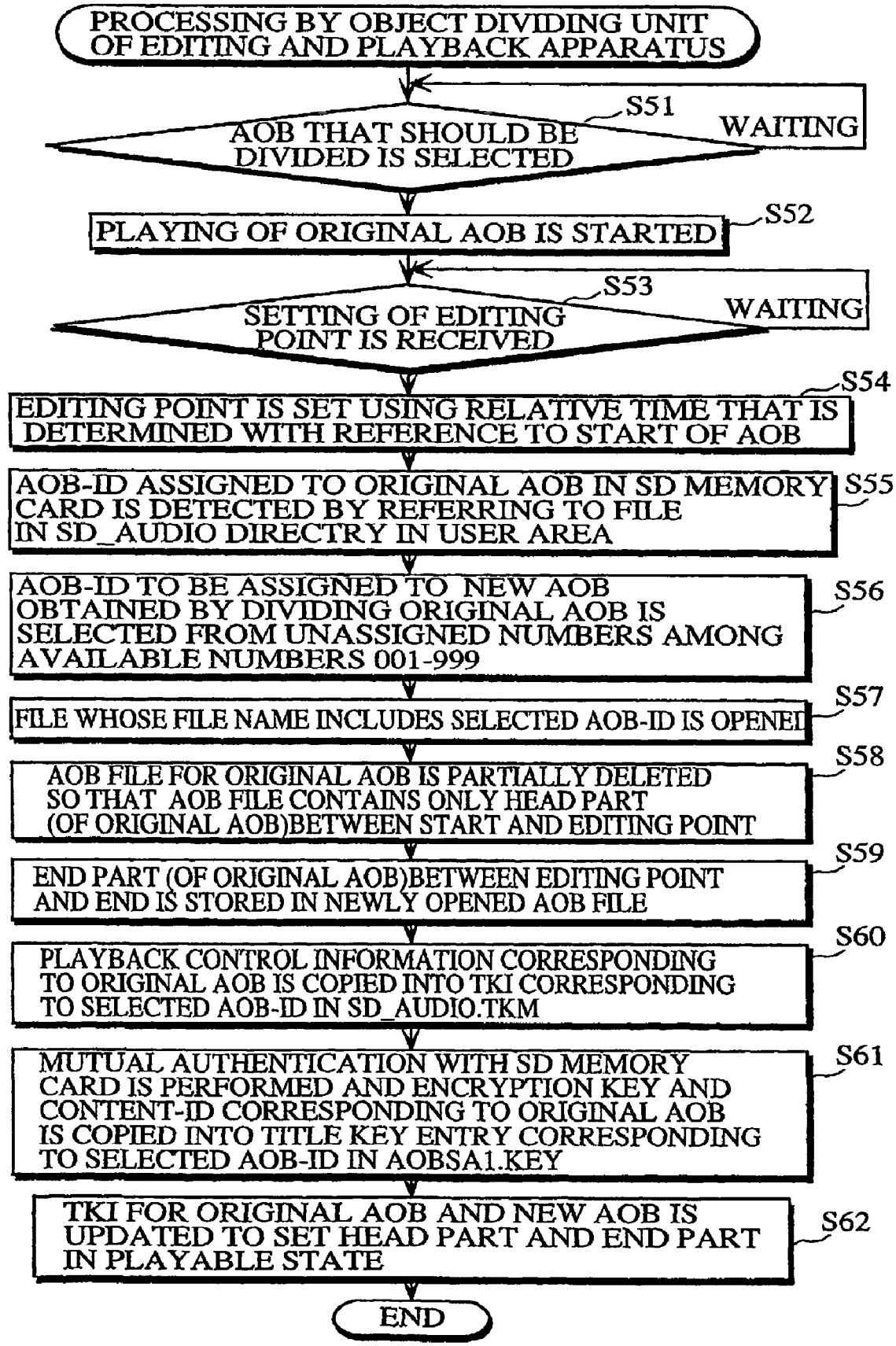
FIG. 24 is a flowchart showing the processing by an object dividing unit of the second embodiment.

The following description concerns the operation of the object dividing unit 12 of the second embodiment. The object dividing unit 12 of the present embodiment is achieved by an executable program for performing the processing in the flowchart shown in FIG. 24.

In step S51, the object dividing unit 12 instructs the user interface unit 10 to display a list of tracks recorded in the SD memory card 100 on the liquid crystal display, and receives an operator's selection of an AOB that should be divided. After an AOB that should be divided is selected, the object playback unit 11 plays back the selected AOB (original AOB) in step S52 and the object dividing unit 12 waits for an editing point to be inputted in step S53. After an editing point is inputted, the object dividing unit 12 sets the editing point for the AOB that is being played back in step S54. In step S55, the object dividing unit 12 refers to the file entries in the SD_Audio directory in the user area to detect the AOB-ID assigned to the original AOB in the SD memory card 100. Following this, in step S56, the object dividing unit 12 selects an AOB-ID, which should be assigned to a new AOB generated by the division of the original AOB, from unassigned numbers among the available numbers 001–999. The object dividing unit 12 then opens an AOB file whose file name includes the selected AOB-ID in step S57. Instep S58, the object dividing unit 12 partially deletes the AOB file corresponding to the original AOB so that the AOB file contains only the head part of the original AOB from the start of the AOB to the editing point. In step S59, the object dividing unit 12 stores the end part of the original AOB from the editing point to the end of the AOB in the newly opened AOB file. In step S60, the object dividing unit 12 copies the playback control information corresponding to the original AOB into a TKI corresponding to the selected AOB-ID in the SD_Audio.TKM. In step S61, after the mutual authentication with the SD memory card 100 is performed, the object dividing unit 12 copies an encryption key and a Content-ID corresponding to the original AOB into a Title Key Entry corresponding to the selected AOB-ID in AOBSA1.KEY. In step S62, the object dividing unit 12 updates a BIT for the original AOB so that only the head part of the original AOB is playable; and updates a BIT for the AOB assigned the selected AOB-ID so that the end part of the original AOB is playable.

Figure 25:
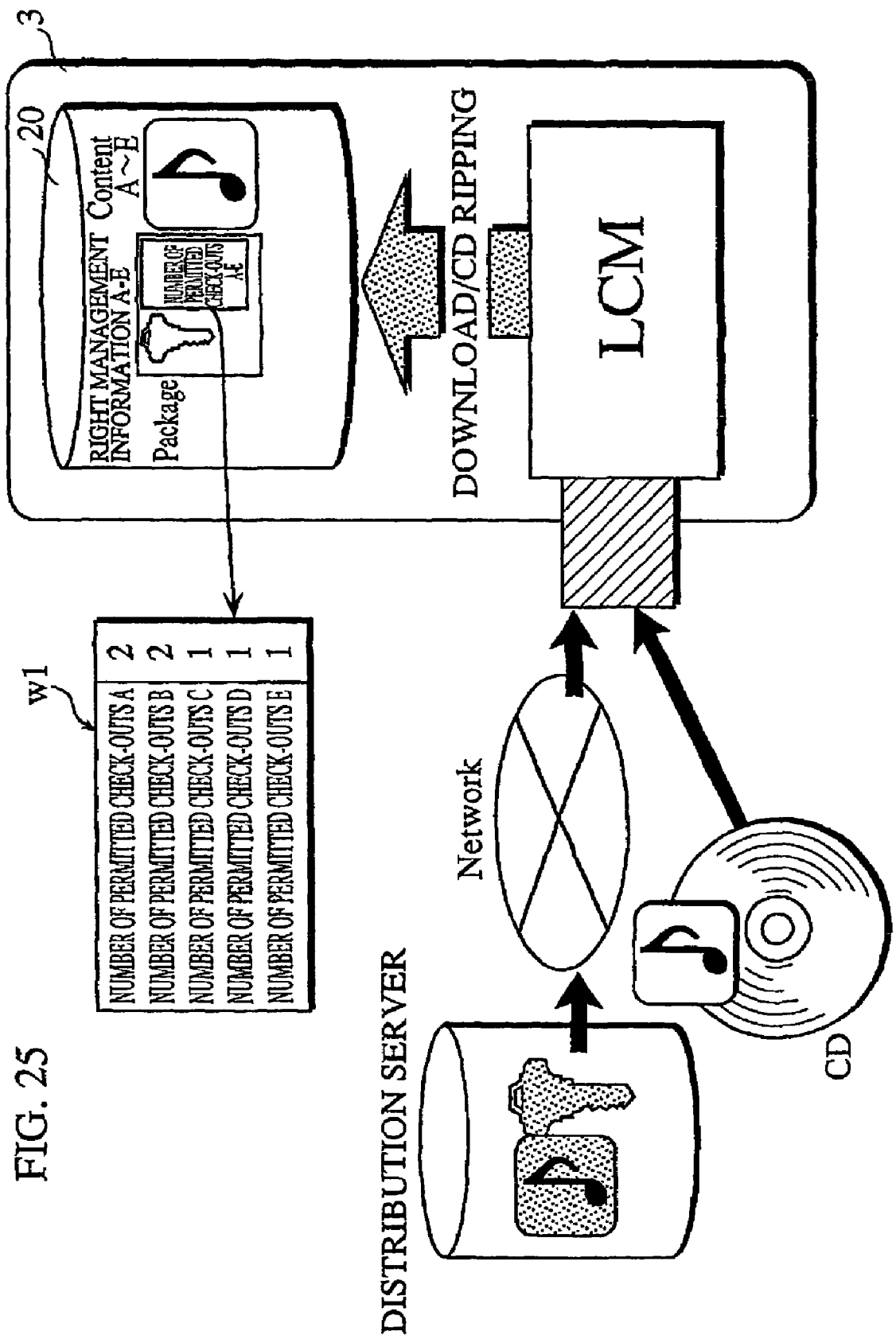
FIG. 25 shows a state where the content management apparatus obtains SDMI protected contents;.
Figure 26:
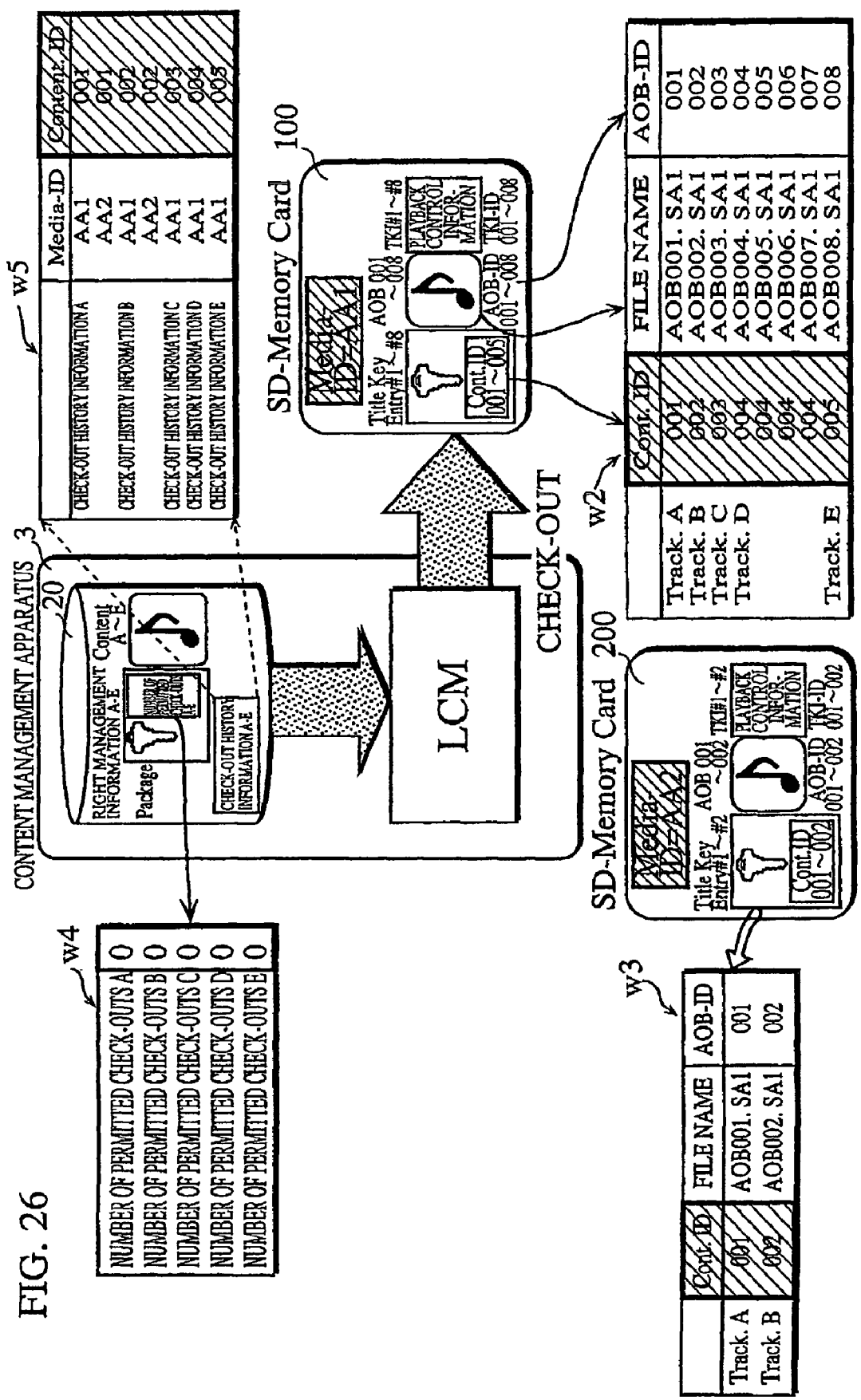
FIG. 26 shows a state where the content management apparatus has performed check-out operations.

The following description concerns check-in and check-out processing by the audio data playback management system of the second embodiment. FIG. 25 shows an initial state where the content management apparatus 3 has obtained five contents (Content.A–Content.E) via a network or from a CD and stored the contents in the local storage 20 together with corresponding right management information A–E. Here, the numbers of permitted check-outs A–E in the right management information A–E are set as shown in a rectangle w1. The numbers of permitted check-outs A and B corresponding to Content.A and Content.B are both set at "2", while the numbers of permitted check-outs C–E corresponding to Content.C–Content.E are all set at "1". FIG. 26 shows a state where Content.A–Content.E have been checked out until all of the numbers of permitted check-outs become "0". Like in FIGS. 10–12 and 14, the SD memory card 100 stores Title Key Entries#1–#8, AOBs001–008, and TKI#1–#8.

AOBs001–008 form five tracks (Track.A–Track.E) together with Title Key Entries#1–#8 and TKI#1–#8. These tracks are assigned Content-IDs and AOB-IDs as shown in a rectangle w2 (information items in this drawing correspond to each other in the same manner as in FIG. 10–12 and 14). The SD memory card 200 stores AOBs001 and 002, and Title Key Entryies#1 and #2 and TKI#1 and #2 corresponding to the AOBs. These AOBs are assigned Content-IDs and AOB-IDs as shown in a rectangle w3.

Because Content.A and Content.B have been checked out twice and Content.C–Content.E have been checked out once, the numbers of permitted check-outs for these contents are all set at "0" as shown in a rectangle w4. The local storage 20 stores history information A–E showing the history of check-out performed on Content.A–Content.E, as shown in a rectangle w5. Content-IDs assigned and stored in each SD memory card can be found by referring to the pairs of Media-IDs and Content-IDs in the history information.

Figure 27:
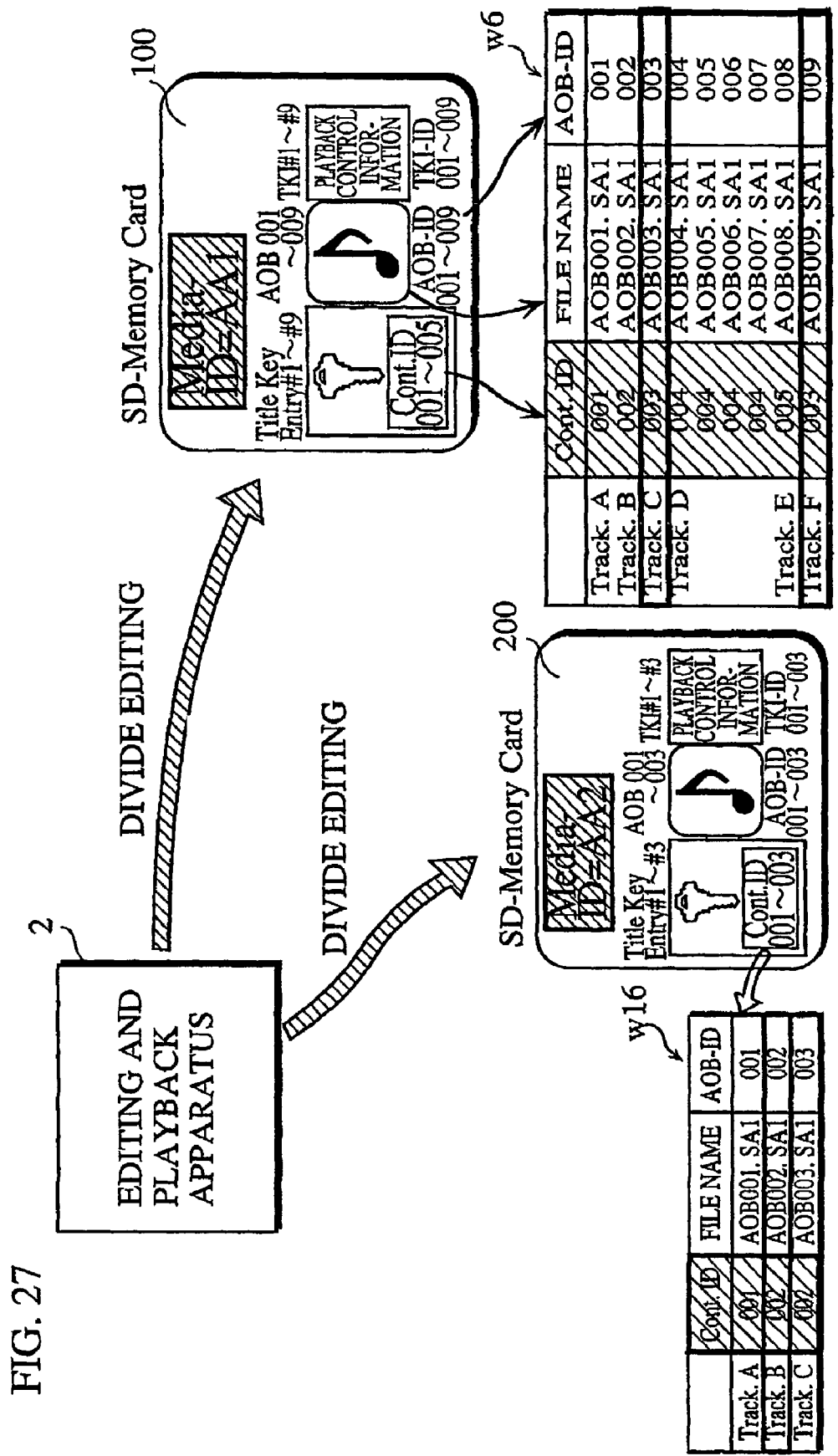
FIG. 27 shows a state where the editing and playback apparatus edits audio tracks that have been recorded in SD memory cards by check-out operations.

FIG. 27 shows a state where the editing and playback apparatus 2 generates new tracks by dividing Track C (AOB003) and Track B (AOB002) that have been respectively recorded in the SD memory cards 100 and 200 by check-out. If the editing and playback apparatus 2 performs editing in a similar manner to the example shown in FIG. 15, Track.F including AOB009 is obtained in the SD memory card 100 as shown in a rectangle w6 and Track.C including AOB003 is obtained in the SD memory card 200 as shown in a rectangle w16. Although being assigned a unique AOB-ID and TKI-ID, each AOB that has been newly generated by dividing a track is given a Content-ID that is the same as that of an original AOB, as shown in FIG. 27.

Figure 29:
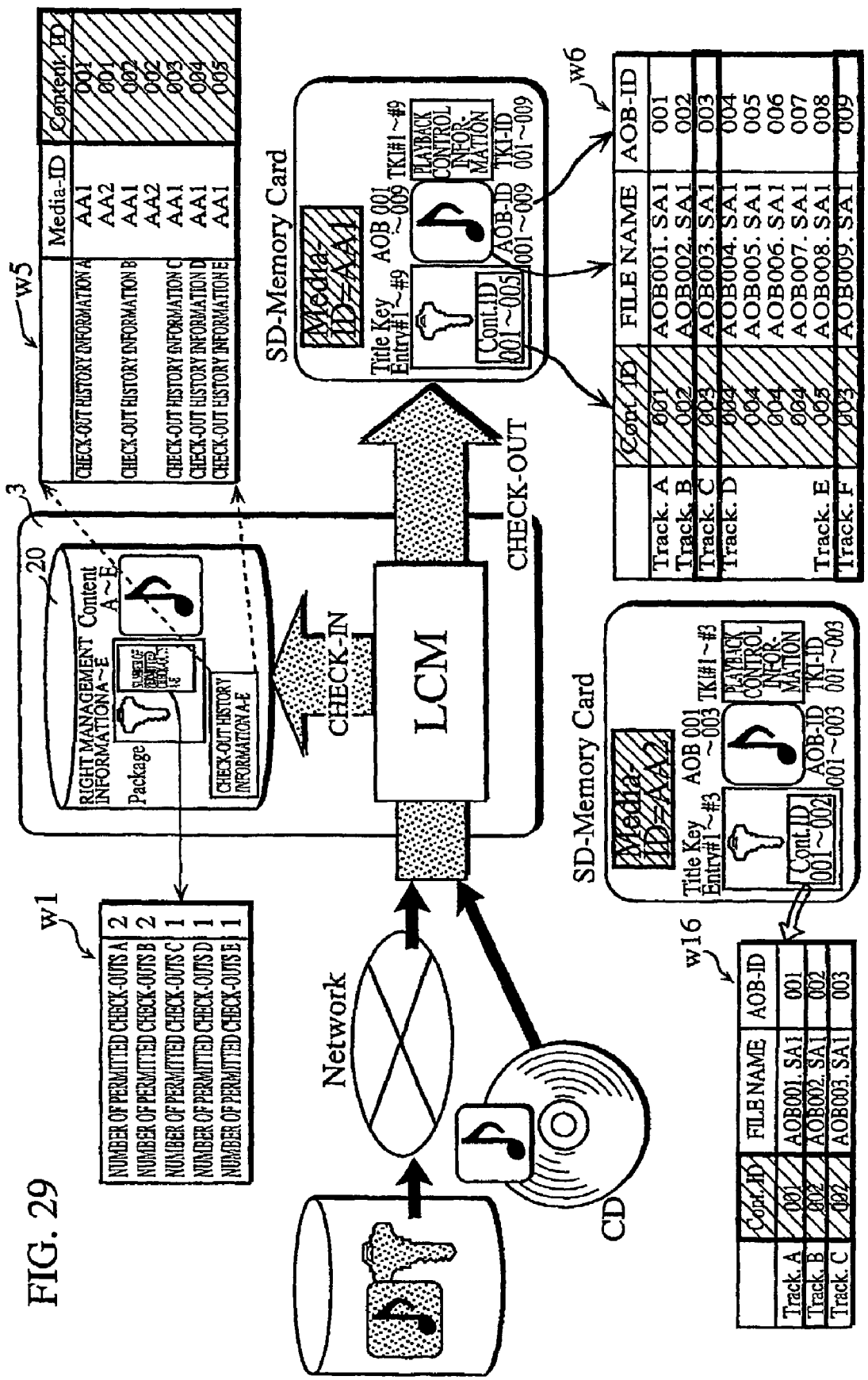
FIG. 29 shows the whole of the processing in FIGS. 25–28 that is performed by the content management apparatus.

FIG. 28 shows the processing by the audio data playback management system of the second embodiment after the sameness between Content-IDs is detected. Because the sameness between Content-IDs has been detected, Title Key Entries#1–#9 in the SD memory card 100 and Title Key Entries#1–#3 in the SD memory card 200 are overwritten with random numbers. In this manner, each AOB in the SD memory cards 100 and 200 is set in a non-playable state. Following this, the numbers of permitted check-outs for Content.A–Content.E are incremented and are set as shown in a rectangle w7. Also, history information concerning these contents is deleted as shown in a rectangle w8. The processing by the audio data playback management system of the second embodiment has been described above (FIG. 29 shows the whole of the operations described above).

As described above, in the present embodiment, the manipulation of Content-IDs is prevented because Title Key Entries are stored in the protected area 103 that is not accessible by devices whose authenticity is not verified. This makes it possible to play back and edit AOBs with consideration given to protection of copyrights to contents.

Details of the data structures and various processing disclosed in the first and second embodiments are described in international patent publications listed below and so are not described here.

WO 00/65602 (Nov. 2, 2000)
WO 00/74054 (Dec. 7, 2000)
WO 00/74059 (Dec. 7, 2000)
WO 00/74060 (Dec. 7, 2000)

The present invention has been described above by means of the embodiments, although it should be obvious that the present invention is not limited to the examples described above. Further variations (A)–(J) are described below.

(A) In the first and second embodiments, if new AOBs are generated by dividing an AOB, the object dividing unit 12 assigns. a Content-ID that is the same as that of the original AOB to each new AOB. However, the object dividing unit 12 may assign a Content-ID that has an equivalence relation with that of the original AOB. For instance, the object dividing unit 12 may assign a Content-ID, some of whose digits or bits are the same as those of the Content-ID of the original AOB.

Also, in the first and second embodiments, the check-in unit 25 performs check-in on each AOB with a Content-ID that is the same as that of an original AOB. However, the check-in unit 25 may perform check-in on each AOB with a Content-ID that has an equivalence relation with that of the original AOB. For instance, the check-in unit 25 may perform check-in on each AOB with a Content-ID, some of whose digits or bits are the same as those of the Content-ID of the original AOB. For instance, if the Content-ID of the original AOB is "001", a new AOB obtained by dividing the original AOB is assigned a Content-ID "801" whose first and second digits are the same as those of the Content-ID of the original AOB and whose third digit is set at a unique value "8". Also, if the Content-ID of the original AOB is "001", a new AOB obtained by dividing the original AOB is assigned a Content-ID "8001" whose second, third, and fourth digits are the same as the first-third digits of the Content-ID of the original AOB and whose first digit is set at a unique value "8".

(B) Each encryption key and a corresponding paired Content-ID and Media-ID may be stored in the semiconductor memory card 1 as a single piece of data. That is, 6-bit padding data "000000" may be added to each 10-bit Content-ID to obtain a 2-byte Content-ID and 8-bit padding data "00000000" may be added to each 56-bit encryption key to obtain an 8-byte encryption key. Then, the 2-byte Content-ID and the 8-byte encryption key may be mixed with an 8-byte Media-ID to obtain a single 18-byte ID and the 18-byte ID may be stored in a corresponding Title Key Entry.

(C) The editing and playback apparatus 2 may be achieved by a component stereo system, a portable telephone, a PDA (Personal Digital Assistance), or a personal computer. Also, the editing and playback apparatus 2 may be achieved as separate apparatuses (an editing apparatus and a playback apparatus) Although achieved by a personal computer in the above embodiments, the content management apparatus 3 may be achieved by a radio-cassette player, a component stereo system, or a STB (Set Top Box) that includes an internal storage apparatus (D) In the first and second embodiments, the content management apparatus 3 stores the originals of contents as distribution formats. During check-out, the content management apparatus 3 converts the contents into AOBs and records the AOBs in the semiconductor memory card 1. However, the content management apparatus 3 may store the originals of contents as AOBs and manage the AOBs by associating each AOB with a corresponding encryption key (Title Key) and right management information.

(E) The local storage 20 may store super-distributable contents. Also, in the above embodiments, each content is supplied to a device in a local SDMI environment via a network. However, each content may be supplied to the device via a distribution system based on a broadcasting satellite or portable telephones. Further, each content may be recorded in a recording medium, such as a DVD-ROM or an SD memory card, and supplied to a device in a local SDMI environment.

(F) A 10-bit Content-ID and a 54-bit arbitrary ID may be combined to obtain an 8-byte ID and the 8-byte ID may be encrypted to generate an 8-byte encrypted Content-ID. In this case, an 8-byte Media-ID is combined with the 8-byte encrypted Content-ID to obtain a 16-byte ID. The 54-bit arbitrary ID is, for instance, the type of a corresponding content (such as audio or an image), the type of a corresponding codec (such as AAC or MP3), or a vendor ID.

(G) A 10-bit Content-ID may be combined with a 54-bit arbitrary ID to obtain an 8-byte ID, the 8-byte ID may be encrypted to obtain an 8-byte encrypted Content-ID, and the 8-byte encrypted Content-ID may be stored in a corresponding. Title Key Entry. The 54-bit arbitrary ID is, for instance, the type of a corresponding content (such as audio or an image), the type of a corresponding codec (such as AAC or MP3), or a vendor ID. The 8-byte encrypted Content-ID may be combined with an 8-byte Media-ID to obtain a 16-byte ID and the 16-byte ID may be stored in a corresponding Title Key Entry.

(H) A hash function may be applied to a paired 54-bit content key and 10-bit Content-ID to obtain a hash value, and the hash value may be stored in a corresponding Title Key Entry. For instance, SHA-1 is an appropriate hash function in this case.

(I) In the first and second embodiments, it becomes possible for the editing and playback apparatus 2, which is not equipped with a licensed compliant module, to playback AOBs by decrypting the AOBs using encryption keys recorded in the semiconductor memory card. If "other processing" is required to set each content in a playable state, the check-out unit 22 may perform the "other processing" during check-out. The "other processing" is, for instance, the reencryption using a different encryption key.

(J) The processing procedures described in the embodiments by referring to the functional block diagrams and the flowcharts (FIGS. 22–24) may be achieved by executable programs. In this case, the executable programs are recorded in recording media, such as IC cards, optical discs, or floppy disks, for the purpose of distribution or sale and are installed onto general-purpose computers. The computers sequentially execute the installed programs and achieve the functions of the management apparatus and editing apparatus of the first and second embodiments.

INDUSTRIAL USE POSSIBILITY

In the audio data playback management system of the present invention that performs check-out and check-in to protect copyrights, it is possible to edit AOBs checked out to the semiconductor memory card 1. This increases user convenience without sacrificing the profits to copyright holders. Thus, each manufacturer engaged in the production of the content management apparatus 3 and the editing and playback apparatus 2 can invigorate the device manufacturing industry by commercializing a high-value audio data playback management system that increases user convenience without sacrificing the profits to copyright holders.

Even if a content obtained from an electronic music distribution system is checked out, the audio data playback management system of the present invention increases user convenience without sacrificing the profits to copyright holders. Therefore, the audio data playback management system of the present invention makes significant contributions to the developments in the electronic music distribution industry and content distribution industry.

The invention claimed is:

1. An audio data playback management system comprising:
a recording medium;
a management apparatus that is operable to store a permitted number, perform a check-out operation by (a) writing a first audio object with a first piece of identification information into the recording medium and (b) decrementing the permitted number, and perform a check-in operation by setting the first audio object in the recording medium in a non-playable state and incrementing the permitted number; and
an editing apparatus that is operable to (c) edit the first audio object by dividing to obtain a second audio object and (d) write the second audio object with a second piece of identification information into the recording medium, the second piece of identification information having an equivalence relation with the first piece of identification information,
wherein the management apparatus is operable to perform a check-in operation on the second audio object corresponding to the second piece of identification information.

2. The audio data playback management system of claim 1,
wherein the first piece of identification information distinguishes the first audio object from another audio object written by a different check-out operation.

3. The audio data playback management system of claim 1,
wherein the management apparatus includes:
a first object ID writing unit operable to, when the first audio object is recorded, write a first object ID corresponding to the first audio object into the recording medium, and
the editing apparatus includes:
a second object ID writing unit operable to, when the second audio object is obtained, write a second object ID into the recording medium, the second object ID corresponding to the second audio object and being different from the first object ID,
wherein the management apparatus is operable to perform the check-in operation on the second audio object corresponding to the second object ID and the second piece of identification information.

4. The audio data playback management system of claim 1,
wherein the management apparatus is further operable to (1) hold a piece of check-out history information that includes media information unique to the recording medium and the first piece of identification information, and (2) perform the check-in operation on the second audio object tat (i) is recorded in the recording medium assigned the media information in the piece of check-out history information and (ii) corresponds to the second piece of identification information having the equivalence relation with the first piece of identification information in the piece of check-out history information.

5. The audio data playback management system of claim 1,
wherein the management apparatus includes:
a storing unit operable to store a protected content;
a judging unit operable to judge whether a playback time of the protected content exceeds a predetermined length of time;
a first object writing unit operable to, when the judging unit judges that the predetermined length has not been exceeded, generate the first audio object from the protected content and write the first audio object into the recording medium; and
a second object writing unit operable to, when the judging unit judges that the predetermined length has been exceeded, generate a plurality of first audio objects from the protected content and write, into the recording medium, the plurality of first audio objects wit a plurality of first pieces of identification information showing the same value.

6. A management apparatus for storing a permitted number, performing a check-out operation by (a) writing a first audio object with a first piece of identification information into a recording medium and (b) decrementing the permitted number, and performing a check-in operation by setting the first audio object in the recording medium in a non-playable state and incrementing the permitted number,
the management apparatus comprising:
a holding unit operable to hold the first piece of identification information;
a connecting unit operable to connect to a target recording medium in which a second audio object has been recorded, the second audio object being an audio object having been obtained by editing the first audio object by dividing;
a reading unit operable to read a second piece of identification information from the connected target recording medium, the second piece of identification information not having been changed by editing;
a judging unit operable to judge whether the second audio object has an equivalence relation with the first audio object by comparing the second piece of identification information with the first piece of identification information; and
a check-in unit operable to, when the judging unit judges that the equivalence relation exists, perform a check-in operation on the second audio object.

7. The management apparatus of claim 6,
wherein the first piece of identification information distinguishes the first audio object from another audio object written by a different check-out operation.

8. The management apparatus of claim 7,
wherein the holding unit is operable to hold a piece of check-out history information that includes media information unique to the recording medium, in which the first audio object has been recorded, and the first piece of identification information, and
the check-in unit is operable to perform the check-in operation on the second audio object that (i) is recorded in the recording medium assigned the media information in the piece of check-out history information and (ii) corresponds to the second piece of identification information having the equivalence relation with the first piece of identification information in the piece of check-out history information.

9. An editing apparatus for an audio data playback management system, the audio data playback management system including a recording medium and a management apparatus, the management apparatus for storing a permitted number, performing a check-out operation by (a) writing a first audio object with a first piece of identification information into the recording medium and (b) decrementing the permitted number, and performing a check-in operation by setting the first audio object in the recording medium in a non-playable state and incrementing the permitted number, the editing apparatus comprising:
a reading unit operable to read the first piece of identification information from the recording medium;
an editing unit operable to edit the first audio object by dividing to obtain a second audio object; and
a writing unit operable to write the second audio object with a second piece of identification information into the recording medium, the second piece of identification information having an equivalence relation with the first piece of identification information for judging whether to perform a check-in operation on the second audio object.

10. The editing apparatus of claim 9,
wherein the first piece of identification information distinguishes the first audio object from another audio object written by a different check-out operation.

11. A recording medium for an audio data playback management system, the audio data playback management system including a management apparatus and an editing apparatus, the management apparatus for performing (1) a check-out operation by writing a first audio object into the recording medium and decrementing a permitted number and (2) a check-in operation by setting the first audio object in the recording medium in a non-playable state and incrementing the permitted number,
the recording medium having a first piece of identification information, a second audio object, and a second piece of identification information recorded therein,
the first piece of identification information distinguishing the first audio object from another audio object written into the recording medium by a different check-out operation,
the second audio object having been obtained by editing the first audio object by dividing, and
the second piece of identification information corresponding to the second audio object and having an equivalence relation with the first piece of identification information for judging whether to perform a check-in operation on the second audio object.

12. The recording medium of claim 11,
wherein the recording medium is a semiconductor memory card comprising:
a protected area, in which the first piece of identification information and the second piece of identification information have been recorded and which is accessible by a device if authenticity of the device is verified; and
a non-protected area, in which the first audio object and the second audio object have been recorded and which is accessible by a device regardless of whether authenticity of the device is verified.

13. A recording medium for a system, the system including a management apparatus operable to perform check-out operations, each check-out operation being performed by (a) writing at least one audio object into a recording medium and (b) decrementing a permitted number,
the recording medium having a media ID prestored therein and a first audio track recorded therein,
the first audio track including a first audio object and a content ID, both of the first audio object and the content ID having been written by one of the check-out operations; and
the media ID being unique to the recording medium,
wherein a pair of the media ID and the content ID uniquely specifies one of the check-out operations
wherein the first audio track further includes a track ID,
wherein the track ID distinguishes the first audio track from a second audio track obtained by dividing the first audio track, and
the content ID shows that the first audio track and the second audio track correspond to the same check-out operation.

14. The recording medium of claim 13,
wherein when the first audio track is combined with a third audio track corresponding to a different check-out operation, the track ID is updated to show that the first audio track should be played back with the third audio track, and
the content ID distinguishes the first audio track from the third audio track, even if the first audio track is combined with the third audio track.

15. The recording medium of claim 13 wherein the first audio object is assigned an object ID,
wherein the object ID distinguishes the first audio object from a third audio object in the third audio track, and
the content ID shows that the first audio object and the third audio object correspond to the same check-out operation.

16. The recording medium of claim 13, wherein the first audio track further includes an ISRC (International Standard Recording Code),
wherein the ISRC and an ISRC in a third audio track are the same value, and
the content ID distinguishes the first audio track from the third audio track, the third audio track corresponding to a different check-out operation.

17. The recording medium of claim 13,
wherein the first audio tack includes a plurality of first audio objects corresponding to a same content with a playback time exceeding a predetermined length of time, each of the plurality of first audio objects corresponding to the same content ID.

18. The recording medium of claim 13,
wherein the recording medium is a semiconductor memory card, the semiconductor memory card comprising:
a protected area, in which content IDs have been recorded and which is-accessible by a device if authenticity of the device is verified; and
a non-protected area, in which first audio objects have been recorded and which is accessible by a device regardless of whether authenticity of the device is verified.

19. A management apparatus for performing check-out operations and check-in operations, each check-out operation being performed by writing an audio track into a recording medium and decrementing a permitted number, and each check-in operation being performed by setting the audio track in the recording medium in a non-playable state and incrementing the permitted number,
the management apparatus comprising:
a storing unit operable to store a permitted number and a piece of check-out history information, the piece of check-out history information including a media ID unique to a recording medium, in which a first audio track has been recorded, and a content ID included in the first audio track;
a connecting unit operable to connect to a target recording medium, in which a media ID and a second audio track have been recorded, the second audio track having been obtained by dividing the first audio track and being an audio track to be checked in;

a judging unit operable to, when the target recording medium is connected, judge whether the piece of check-out history information matches the media ID in the target recording medium and a content ID in the second audio track; and a check-in unit operable to, when the judging unit judges that there is a match, perform a check-in operation on the second audio track.

20. An editing apparatus for editing a first audio track recorded in a recording medium, the first audio track being assigned a track ID and including a first audio object with a content ID, the recording medium having a media ID, the editing apparatus comprising:

an editing unit operable to edit the first audio track to obtain a second audio track; and an identification information assigning unit operable to assign a new track ID and a content ID to the second audio track, the new track ID being unique to the second audio track and the assigned content ID having an equivalence relation with the content ID in the first audio track, wherein the editing unit is operable to edit by dividing the first audio track to obtain the second audio track.

21. The editing apparatus of claim 20, wherein the editing unit is further operable to edit by combining the first audio track with another audio track to obtain a third audio track, and the identification information assigning unit is operable to assign a new track ID and a content ID to the third audio track, the new track ID being unique to the third audio track and the assigned content ID having an equivalence relation with the content ID in the first audio track.

22. The editing apparatus of claim 20, wherein the first audio object in the first audio track has an object ID, and the identification information assigning unit is operable to assign a new object ID to a second audio object in the second audio track, the new object ID being unique to the second audio object.

23. A program recorded on a computer-readable recording medium for a computer to perform check-out operations and check-in operations, the computer storing a permitted number and a piece of check-out history information, each check-out operation being performed by writing an audio track into a recording medium and decrementing the permitted number, each check-in operation being performed by setting the audio track in the recording medium in a non-playable state and incrementing the permitted number, the piece of check-out history information including a media ID unique to a recording medium, in which a first audio track has been recorded, and a content ID included in the first audio track, the program comprising:

a connecting operation of connecting to a target recording medium, in which a media ID and a second audio track have been recorded, the second audio track having been obtained by dividing the first audio track and being an audio track to be checked in;

a judging operation of, when the target recording medium is connected, judging whether the piece of check-out history information matches the media ID in the target recording medium and a content ID in the second audio track; and a check-in operation of, when the judging operation judges that there is a match, performing a check-in operation on the second audio track.

24. A program recorded on a computer-readable recording medium for a computer to edit a first audio track recorded in a recording medium, the first audio track being assigned a track ID and including a first audio object with a content ID, the recording medium having a media ID, the program comprising:

an editing operation of editing the first audio track to obtain a second audio track; and an identification information assigning operation of assigning a new track ID and a content ID to the second audio track, the new tack ID being unique to the second audio track and the assigned content ID having an equivalence relation with the content ID in the first audio track, wherein the editing operation is operable to edit by dividing the first audio track to obtain the second audio track.

25. A method for having a computer perform check-out operations and check-in operations, each check-out operation being performed by writing an audio track into a recording medium and decrementing a permitted number, each check-in operation being performed by setting the audio track in the recording medium in a non-playable state and incrementing the permitted number, the computer storing the permitted number and a piece of check-out history information, the piece of check-out history information including a media ID unique to a recording medium, in which a first audio track has been recorded, and a content ID included in the first audio track, the method comprising:

a connecting operation of connecting to a target recording medium, in which a media ID and a second audio track have been recorded, the second audio track having been obtained by dividing the first audio track and being an audio track to be checked in;

a judging operation of when the target recording medium is connected, judging whether the piece of check-out history information matches the media ID in the target recording medium and a content ID in the second audio track; and a check-in operation of, when the judging operation judge that there is a match, performing a check-in operation on the second audio track.

26. A method for having a computer edit a first audio track recorded in a recording medium, the first audio track being assigned a track ID and including a first audio object with a content ID, the recording medium having a media ID, the method comprising:

an editing operation of editing the first audio track to obtain a second audio track; and an identification information assigning operation of assigning a new track ID and a content ID to the second audio track, the new track ID being unique to the second audio track and the assigned content ID having an equivalence relation with the content ID in the first audio track, wherein the editing comprises editing by dividing the first audio track to obtain the second audio track.

* * * * *

UNITED STATES PATENT AND TRADEMARK OFFICE
CERTIFICATE OF CORRECTION

PATENT NO. : 7,159,244 B2
APPLICATION NO. : 09/959827
DATED : January 2, 2007
INVENTOR(S) : Hideki Matsushima et al.

It is certified that error appears in the above-identified patent and that said Letters Patent is hereby corrected as shown below:

In the Claims
In column 30, claim 5, line 10, please change "objects wit a" to --objects with a--.
In column 32, claim 15, line 16, please change "claim 13 wherein" to --claim 13, wherein--.
In column 32, claim 18, line 42, please change "is-accessible" to --is accessible--.
In column 34, claim 24, line 14, please change "new tack ID" to --new track ID--.
In column 34, claim 25, line 38, please change "operation of when" to --operation of, when--.

Signed and Sealed this

Twelfth Day of June, 2007

JON W. DUDAS
*Director of the United States Patent and Trademark Office*